United States Patent

Norin et al.

[11] Patent Number: 5,832,514
[45] Date of Patent: Nov. 3, 1998

[54] SYSTEM AND METHOD FOR DISCOVERY BASED DATA RECOVERY IN A STORE AND FORWARD REPLICATION PROCESS

[75] Inventors: Scott Norin, Newcastle; Darren Arthur Shakib; Max Loell Benson, both of Redmond, all of Wash.

[73] Assignee: Microsoft Corporation, Redmond, Wash.

[21] Appl. No.: 670,588

[22] Filed: Jun. 26, 1996

[51] Int. Cl.[6] ................................................. G06F 15/163
[52] U.S. Cl. ........................... 707/202; 707/10; 707/203; 707/204; 395/185.1; 395/200.31; 395/200.39
[58] Field of Search .............................. 395/610, 200.03, 395/200.19, 182.11, 183.17, 620, 619, 618, 200.31, 200.39, 185.1; 707/10, 203, 202, 204

[56] References Cited

U.S. PATENT DOCUMENTS

| | | | |
|---|---|---|---|
| 5,136,707 | 8/1992 | Block et al. | 395/600 |
| 5,230,047 | 7/1993 | Frey, Jr. et al. | 395/575 |
| 5,388,255 | 2/1995 | Pytlik et al. | 395/600 |
| 5,418,945 | 5/1995 | Carter et al. | 395/600 |
| 5,434,994 | 7/1995 | Shaheen et al. | 395/500 |
| 5,446,880 | 8/1995 | Balgeman et al. | 395/600 |
| 5,495,610 | 2/1996 | Shing et al. | 395/600 |
| 5,553,279 | 9/1996 | Goldring | 395/600 |
| 5,555,404 | 9/1996 | Torbjornsen et al. | 395/600 |
| 5,579,503 | 11/1996 | Osborne | 395/446 |
| 5,613,106 | 3/1997 | Thurman et al. | 395/620 |
| 5,630,116 | 5/1997 | Takaya et al. | 395/617 |

OTHER PUBLICATIONS

Yavin, D. "Replication's Fast Track," *BYTE*, Aug. 1995, pp. 88a–88d, 90.

*Primary Examiner*—Thomas G. Black
*Assistant Examiner*—Jean R. Homere
*Attorney, Agent, or Firm*—Workman, Nydegger, & Seeley

[57] ABSTRACT

Systems and methods for discovery based data recovery in a store and forward replication system are presented. Data loss is discovered by comparing a list of changes made to a local copy of a replica object with a list of changes received over the network from other nodes also having a copy of the replica object. When the list of changes received contains changes that the local list does not, the local system knows its copy of the replica object is not up-to-date. Missing changes are then requested from other systems having the missing data. In making the request, care is taken to minimize the cost incurred in recovering the missing data and to balance network traffic among several other nodes, if possible.

43 Claims, 9 Drawing Sheets

SYSTEM AND METHOD FOR DISCOVERY BASED DATA RECOVERY IN A STORE AND FORWARD REPLICATION PROCESS

I. BACKGROUND OF THE INVENTION

A. The Field of the Invention

The present invention relates to systems and methods for replication of data, that is, transferring changes (e.g., creation of new data, modification of existing data or deletion of existing data) made locally at one server to a specified list of other remote or locally connected servers. More specifically, the present invention relates to systems and methods for accurately keeping track of replication data broadcast from one server to one or more other servers, and for quickly and efficiently recovering lost or missing replication data.

B. The Prior State of the Art

Today, business and technology trends are changing the way we use computers and information. The personal computer or PC has become the standard business information tool as prices have decreased and computing power has increased. In record numbers, businesses are reenginering their organizational structure and processes to become faster and more competitive, in addition to being better able to use the wealth of information resources available today. Never before has there been so much information so readily available nor such high expectations for how much the individual will be able to accomplish by utilizing this information. The result is that people today need access to information everywhere, anytime. In June 1994, Microsoft announced a new product designed to meet these needs, called Microsoft® Exchange.

The main concept behind Microsoft® Exchange is to provide a product that integrates E-mail, scheduling, electronic forms, document sharing, and other applications such as customer tracking to make it altogether easier to turn information into a business advantage. The result is that users can access, organize, and exchange a world of information, wherever they happen to be in the world—whether from the office, the home, or while traveling on the road. In essence, a main barrier to PC-based communication, namely, accessibility and sharing by multiple parties of up-to-the-minute information, has now been significantly reduced.

With the increased accessibility and sharing of information between multiple users, it is now more common than ever for such multiple users to simultaneously or in tandem work on shared data set objects, as for example word processing documents, spreadsheets, electronic forms, E-mail messages, graphics images or a host of other such data objects. With such shared use of data objects among multiple users of a computer network (sometimes referred to as an "enterprise"), there arises the need for each user to keep all other users of the same data object or the same set of data objects apprised of changes that are locally made by that user. This need gives rise to a process called replication of data, that is, transferring locally made changes (e.g., creation of new data, modification of existing data or deletion of existing data) at one server to a specified list of other remote or locally connected servers. Such replication processes in turn require systems and methods for accurately keeping track of replication data transferred from one server to one or more other servers, and for preventing loss of information or quickly and efficiently recovering lost or missing replication data.

There are at least three situations that arise which are of particular concern when dealing with lost or missing data. The first situation is where data is lost during transfer from one server to another. This creates a situation where the servers have different versions of the same data. The second situation is where a new server comes into the network. On startup this server generally has little or no information about the data sets replicated among network servers. This usually requires that the new server be brought up to date with respect to the replicated data sets. The final situation is similar to the second situation and involves the addition of a new replicated data set to an existing server. Again, the server must be brought up to date with respect to that data object.

In the past, several approaches have been taken to replication of data. One popular class of replication systems rely on every server talking explicitly to every other server. This approach, generally referred to as "point-to-point" replication, requires a fully connected plication topology. A fully connected replication topology in turn requires a physical communication link between a server and each and every other server in the network. Such a fully connected replication topology allows a single server to talk to each and every other server directly.

In a point-to-point replication system, when a server has information which should be replicated, the server initiates a two-way communication dialog with each and every other server in the replication topology, one after the other. During the dialog, the server transferring information will send the information to the recipient server and then wait for the recipient server to acknowledge proper reception of the transferred data. When all data has been transferred and acknowledged in this manner, the server will then break the communication dialog and initiate another communication dialog with the next server in the replication topology. By contacting each and every server and waiting for an acknowledgment of proper reception of the data, the point-to-point replication system tries to minimize data loss by ensuring that the data is not lost during transfer. This solves the problem of data lost in transfer. When adding a new server or adding a new replicated data set, generally the new server must contact at least several, if not all, existing servers to ensure that it receives all existing information and is not missing any data. Thus, these two situations can involve very intense communications between two or more servers.

Point-to-point replication systems work quite well with small replication enterprises. However, as is apparent from the above description, point-to-point replication is message intensive and requires a large communication bandwidth between servers. Thus, as the number of servers in the replication enterprise grows, the point-to-point replication process degrades rapidly and the network capacity is soon exceeded. Because of this characteristic, a point-to-point replication system is generally considered to be totally unworkable for a replication enterprise with a large number of servers. With the explosive growth of large scale networks which may contain hundreds, thousands, or possibly hundreds of thousands of systems, such an approach seems to be of very limited value.

In order to overcome some of the limitations of a point-to-point replication system, other replication systems which rely on a specific replication topology have been developed. One such replication topology utilizes a central server or "hub" connected to a plurality of other servers sometimes called satellites. In such a system, when a satellite has information to be distributed to other satellites connected to the hub, the server transfers the message to the hub and allows the hub to distribute the information to the other satellites. To ensure reliable data transmission, communications between a server and the central hub are generally two-way, acknowledged communications. As the number of servers in the network increases, more hubs are added. The hubs are then interconnected so that data may flow from a satellite connected to one hub to another satellite connected to a separate hub.

Although the use of hubs and specially configured topologies helps alleviate some of the problems encountered in a point-to-point replication system, such systems force users purchase specialized hardware and configure their network in predefined topologies. In particular, such topologies do not allow large scale peer-to-peer communication where all systems in an enterprise are the same and the use of hubs is not required. Topologies requiring hubs may not fit the needs or budget of a particular customer. Systems which rely on special hardware or topologies, then, do not provide the flexibility demanded by many customers.

Another significant problem with current replication systems is that they require a specific type of network to work. In both the point-to-point and hub routed replication systems, two-way communication dialogs are usually used. Thus, it is impossible for these systems to replicate data over certain types of networks which use foreign communication protocols or which generally only support one-way communications. For example, current replication systems cannot use networks such as the Internet which uses SMTP communication protocols.

Thus, there currently does not exist a replication system which provides not only needed flexibility for the user but also good reliability to ensure that data replicated across an enterprise is reliably and efficiently transferred. In particular, there does not exist a replication system which can take advantage of currently installed hardware and network configurations and which also allows growth of a replication enterprise to accommodate a virtually limitless number of systems. There also does not currently exist systems and methods which allow the foregoing to operate together in a peer-to-peer environment. Finally, there does not currently exist a replication system that can replicate data over foreign networks such as the Internet or other wide area networks supporting only one-way communications.

II. SUMMARY AND OBJECTS OF THE INVENTION

A. Glossary of Terms

In order to assist in more easily understanding the terminology used in the following summary of the invention and detailed description, the following definitions for key terms are provided:

Affinity: Site-to-site cost, as assigned or specified by a network administrator, for transferring data from one site to another.

Asynchronous store and forward replication: A process of replicating data throughout a network or enterprise by broadcasting locally made changes (e.g., creation of new data, modification of existing data, or deletion of existing data) to a specified list of servers (called replica nodes) which contain copies of the data. Communications in store and forward replication are one-way and there is no acknowledgment of receipt of messages containing the changes.

Backfill: A discovery based data recovery process by which changes held by other servers (called replica nodes) but not held locally are recovered so that the copy of the data set (called a replica) held locally is the same as replicas held by other replica nodes.

Backfill set: A list of changes held by other replica nodes but not held locally.

Change number: A unique identifying code used to identify a particular change made to a particular data object by a particular replica node.

Change range: A range of changes, identified by a minimum and maximum change number. The change range is inclusive of the minimum and maximum change number.

Change set: The set of change ranges that defines the changes available for a given replica of a data set on a given replica node. The change set contains change made on the local replica node and changes to the data set received from other replica nodes through the replication process.

Data set: A set of objects which can be replicated. In one sense a data set can be thought of as a container with various data set properties which holds or stores data objects, much like a folder contains documents. A populated data set includes the data objects, while an unpopulated data set does not have any associated data objects and only refers to the data set properties.

Data set list: A list of the data set properties for the data sets being replicated across the enterprise. In one sense, a data set list can be thought of as a container which holds or stores data sets (as defined by their data set properties).

Data set properties: A set of information that describes a data set. Data set properties can include such information as a name and/or ID value and a list of servers which have the contents of a data set (the replica list).

Enterprise: The set of servers (or replica nodes) comprising the replication environment.

Replica: A local copy of a particular data set replicated on one or more replica nodes throughout the network.

Replica list: A list of all replica nodes on the network containing a replica of a data set.

Replica node: A server or other location on the network where a copy of a data set (called a replica) resides.

Replica object: An object or group of objects which can be replicated. This term includes at least, individual data objects and data set properties.

Replica object distribution list: A general term for the distribution list for a replica object. For example, if the replica object is a data object, the replica object distribution list is a replica list.

Site: A plurality of replica nodes in which each node is relatively similar in terms of cost to access data, as compared to the cost between sites. Cost is representative of factors such as the monetary cost to obtain data, the speed of obtaining data, and the reliability of obtaining data.

B. Brief Summary and Objects of the Invention

The foregoing problems in the prior state of the art have been successfully overcome by employing a store and forward replication process together with the present invention, which is directed to a system and method for discovery based data recovery (sometimes referred to as "backfilling") for accurately keeping track of replication data broadcast from one server to one or more other servers, and for quickly and efficiently recovering lost or missing replication data when using a store and forward replication process among multiple users connected together on a computer network.

A store and forward replication process utilizes existing networking hardware as a transport system to deliver one-way, unacknowledged messages between servers within a replication enterprise, much like E-mail messages are delivered between users of computer systems. In a store and forward replication process, each server keeps track of locally made changes to a particular copy of a replication data set (sometimes referred to as a "replica"). Each server with a replica knows of all other servers having a copy of the same replica by keeping a "replica list" which contains such other servers. Periodically each server on the replica list broadcasts all new (since the last broadcast interval) changes made to the local copy of the data set (the replica) to every other server on the replica list. In the same broadcast, the server also includes the "change set" available for the local copy of the data set on the server. A "change set" is basically a list of changes which have been made to the local copy of the data set and includes not only those changes made locally by the server but also those changes received from other servers on the replica list.

In addition to the replication of data objects in a data set as described above, store and forward replication can also be used to replicate the "properties" of data sets. Properties of data sets describe the data sets and can include such information as the name and/or other ID of the data set, access privilege information such as a list of users that can access or change the contents and/or properties of the data set, and a list of servers which contain a copy of the populated data set (e.g. the replica list of the data set). Since the properties of a data set and the contents of the data set can be replicated independently, a server can receive the properties of a data set without receiving the contents of the data set. Such a situation is analogous to receiving the data set container without the data set objects to fill the data set container.

As changes are made to the data set properties, a change set can also be kept on the data set properties. This change set would include all changes which have been made to the properties for a particular data set. As in the case for change sets of data objects, such a change set would include not only those changes made locally, but also those changes received from other servers.

In accordance with the present invention, which relates specifically to discovering lost or missing change data, when a change set is received by a server, the server compares the received change set to the change set present on the server. If the received change set contains changes not present in the change set on the server, then the server knows (or has "discovered") that its local copy of the data is not current. By comparing its local change set with the change sets received from other servers on the replica list, a server can discover what changes are missing from its local copy of the data and what servers on the replica list can provide those changes to the server. This process works equally well for both data set properties and data set objects by using the appropriate change set.

Once a server discovers changes missing from its change set, the server can request the missing changes from another server with the desired changes. The process for requesting the missing changes from other servers not only ensures that the missing changes are reliably obtained, but also reduces unnecessary traffic on the network by allowing for variable delays in routing messages between one server and another, which may cause the local change set to be temporarily out of sync with the change sets of other servers on the replica list. Furthermore, when the server discovers that more than one server on the replica list has the needed changes, the server requests the changes from one or more servers on the replica list in a manner which minimizes the cost to obtain the changes and, if possible, balances the burden of fulfilling such requests among various servers on the replica list.

Accordingly, it is a primary object of this invention to provide systems and methods for discovery based data recovery which quickly and efficiently provide for discovery of data missing from a local replica and recovery of the missing data.

Another primary object of the present invention is to provide discovery based data recovery systems and methods which take advantage of existing networking hardware and any accompanying network control software by employing such hardware and software as a Message Transport Agent (MTA) to deliver messages between replica nodes.

Another important object of the invention is to provide systems and methods for discovery based data recovery which are scalable in that they do not significantly degrade in performance when an increasingly large number of replica nodes are added to the network.

It is a further object of the present invention to minimize unnecessary traffic on the network when discovering and recovering missing data.

Yet another object of the present invention is to provide additional mechanisms which minimize discovery time in appropriate circumstances.

A still further object of the present invention is to provide data based discovery systems and methods which allow data to be restored to a server from a backup source and then brought to a current state.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

III. BRIEF DESCRIPTION OF THE DRAWINGS

In order that the manner in which the above recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which.

IV. DETAILED DESCRIPTION OF THE PRESENT INVENTION

Figure 1:
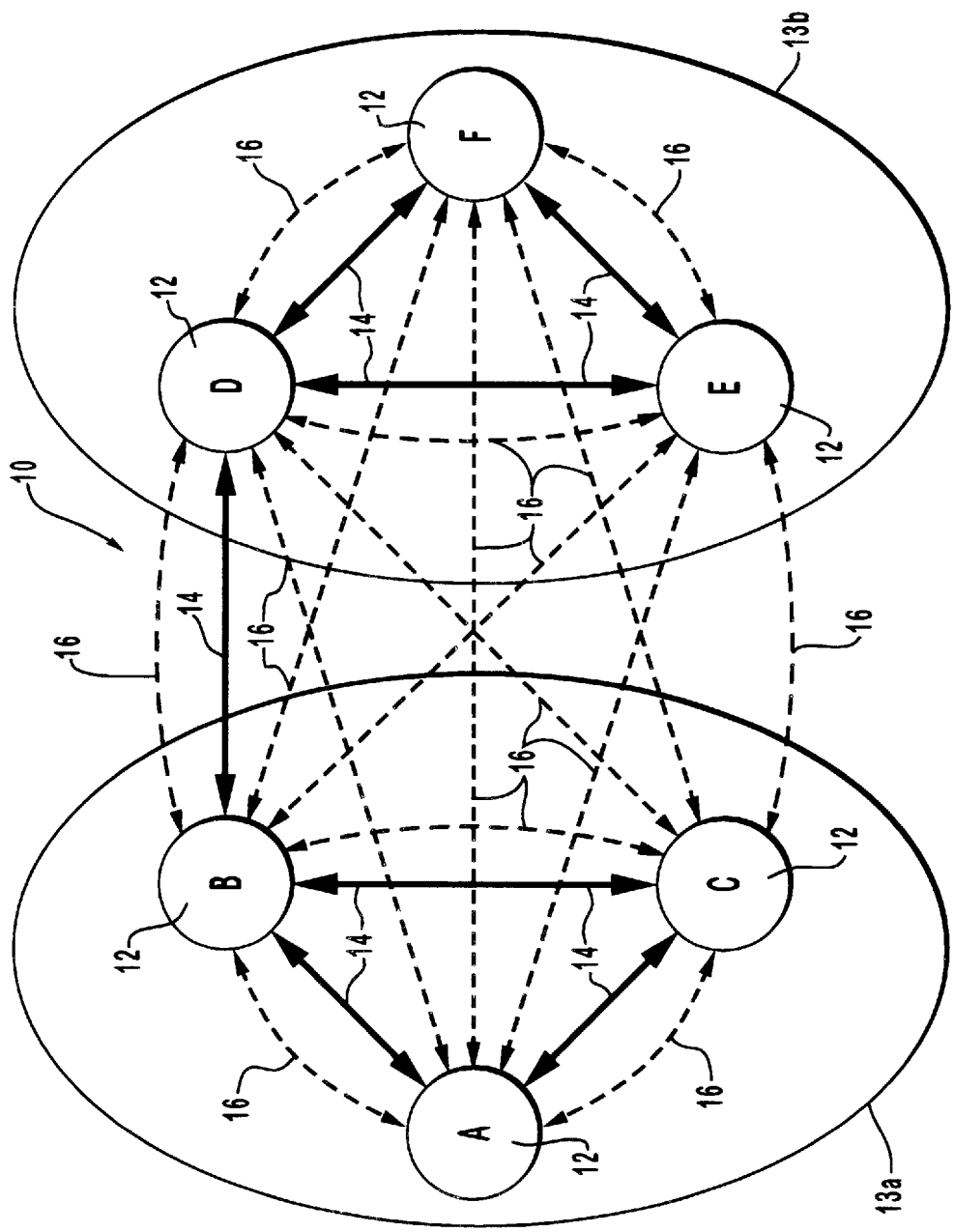
FIG. 1 is a representation of the topology of an example replication enterprise.

In the following detailed description, the present invention is described by using flow diagrams to describe either the structure or the processing that is presently preferred to implement the method of the present invention. Using this manner to present the present invention should not be construed as limiting of its scope. The present invention contemplates both methods and systems for discovery based data recovery. The presently preferred embodiment of a system for discovery based data recovery comprises a general purpose computer. The currently disclosed system, however, can also be used with any special purpose computer or other hardware system and all should be included within its scope.

Finally, embodiments within the scope of the present invention also include articles of manufacture comprising program storage means and having encoded therein program code means. Such program storage means can be any available media which can be accessed by a general purpose or special purpose computer. By way of example, and not limitation, such program storage means can comprise RAM, ROM, EEPROM, CD-ROM or other optical disk storage, magnetic disk storage or other magnetic storage devices, or any other medium which can be used to store the desired program code means and which can be accessed by a general purpose or special purpose computer. Combinations of any of the above are also included within the scope of such program storage means.

Program code means comprises, for example, executable instructions and data which causes a general purpose or special purpose computer to perform a certain function or functions.

A. Summary of Store and Forward Replication

Although store and forward replication does not form a specific part of the present invention, an understanding of the basics of store and forward replication is helpful in understanding the details of the present invention. For a detailed discussion of store and forward replication see copending U.S. patent application Ser. No. 08/673,741, entitled "System and Method for Asynchronous Store and Forward Data Replication" (hereinafter referred to as the "Store and Forward Application"), which is incorporated herein by reference.

Asynchronous store and forward replication, or simply store and forward replication, is designed to utilize existing networking hardware, networking control software and networking configurations as a transport system to deliver at least one-way, unacknowledged communications between systems in a replication enterprise. In the context of this application, networking hardware and any associated networking control software which performs this transport system function will be referred to as the Message Transport Agent (MTA). One-way, unacknowledged communications means that the store and forward replication process delivers a message to be transferred to the MTA and does not receive feedback as to the success of the transfer. Primarily for efficiency reasons, the systems and methods that are the subject of this invention and the invention described in the copending Store and Forward Application have been designed with the presumption that no acknowledgment or feedback is required. The concepts disclosed in this application and in the copending Store and Forward Application, however, could be modified to use any status information available from the MTA. Similarly, the concepts of this invention could be used with virtually any type of replication system with appropriate modification. However, the store and forward replication system provides the presently preferred context of this invention.

Turning now to FIG. 1, an example of a network, referred to as a "replication enterprise" or simply an "enterprise," is shown generally as 10. In a store and forward replication process, a given populated data set, referred to as a "replica," and/or a given unpopulated data set, referred to as "data set properties," is replicated at one or more locations in the enterprise. In FIG. 1, the locations where a replica or data set properties can reside are referred to as "replica nodes" and are shown as 12 and labeled A–E. The term "replica node" is preferred over the term "server" since "server" often implies a system which serves one or more desktop, laptop or other computers. Replica nodes include not only servers in the traditional sense of the term, but also desktop, laptop, or any other system where a copy of a replica or data set properties may reside.

In the context of this invention, the term "replica" will be used to refer to a specific copy of a set of one or more data objects which are to be replicated as a unit across one or more replica nodes. The terms "replica" and "data object" are intended to be read broadly and encompass any type or format of data to be replicated. "Unpopulated data set" or "data set properties" refer specifically to data sets without the data objects. The term "replica objects" will be used to refer broadly to either data objects or data set properties.

In the enterprise, replica nodes may be grouped into "sites." A site is a plurality of replica nodes with relatively similar costs to access data. Replica nodes within a site are generally, but not necessarily, located in a relatively localized geographic area and have high speed connectivity between nodes, such as, for example, Local Area Network (LAN) connections. The cost to access data between sites is generally much greater than the cost to access data within a site. Site groupings are typically assigned by a system administrator. FIG. 1 shows two sites, designated 13a consisting of replica nodes A, B, and C, and 13b, consisting of replica nodes D, E, and F.

As previously mentioned, replica nodes are connected by physical network connections. In FIG. 1, the physical network connections 14 are illustrated by the solid lines. As shown in FIG. 1, each replica node 12 may not be fully connected by physical network connections 14 to every other replica node 12 (note that the site containing the A-B-C group is connected to the site containing the D-E-F group by only a single link). All that is required, however, is that the physical connections be sufficient to provide a data flow path between each of the replica nodes. Furthermore, physical connections 14 may be of any type. For example, the physical connections between replica nodes A, B, and C may be a LAN or other high speed link while the connection between replica nodes B and D may be a slower dial-up, Internet, Wide Area Network (WAN), or other long haul connection.

By ensuring a data flow path between each of the replica nodes, the entire enterprise is logically fully connected even though the physical connections are of arbitrary topology. In FIG. 1, the logical network connections forming the fully connected logical topology are illustrated by dashed lines 16.

In a store and forward replication system, each replica node keeps track of all changes made locally to a replica object. The system then periodically broadcasts through the MTA any new changes made locally since the last replication broadcast to all other replica nodes with a copy of the replica object. The change set for the replica object is also broadcast along with the new changes. Where the replica object is one or more data objects of a data set, list of replica nodes having a copy of the particular data set (referred to as a "replica list") is kept locally so the local replica node knows which other replica nodes need to receive the changes made to the data objects of the data set.

When the replica object comprises data set properties, the properties may be replicated to all or some of the replica nodes in the enterprise. When the properties are replicated to some of the replica nodes in the enterprise, it may be desirable to keep one or more lists, analogous to the replica lists, to track which replica nodes receive the properties of which data sets. If all replica nodes in the enterprise receive the properties of all data sets, no such lists are needed. Replica nodes in the enterprise which have a list of the properties of all data sets know which data sets are available throughout the enterprise along with the replica nodes where a replica of each data set may be found. This replication of the "properties" of data sets occurs independently from any replication of data sets themselves.

Because messages sent via the MTA to other replica nodes are one-way, a mechanism must be put in place to ensure that all replica objects throughout the system are synchronized, or in other words, are up-to-date. If a new replica node is added to the replica list of a data set or data set properties, either because the replica node just came on line or because a decision was made to send the replica object to a new node, this mechanism must quickly and efficiently allow the replica node to receive changes to the replica object that happened before the replica node was added to the replica list. Furthermore, if messages are lost or not received properly through the MTA, then the mechanism must be able to quickly and efficiently recover the lost data. These situations are addressed by the instant invention.

B. Summary of Discovery Based Data Recovery

The fundamental basis of the discovery based data recovery method of the present invention is for each replica node to track both changes made locally and changes received from other replica nodes. The changes made locally and the changes received from other replica nodes form the basis for the current state of the replica object on a particular replica node. By broadcasting the local change set containing a list of changes known at a local replica node, other replica nodes can discover if their replica object is up-to-date and take steps to bring out of date replica objects up-to-date.

Once missing data is discovered, the process of the present invention provides a coherent system for recovering missing data efficiently in order to utilize effectively the communication bandwidth between replica nodes. The system minimizes the cost incurred to synchronize replica objects among replica nodes by requesting data from nodes with lower cost. Discovery time (the time to discover that a replica object is missing one or more changes) can also be minimized in certain circumstances by requesting the change set containing changes known at one or more replica nodes.

Figure 2:
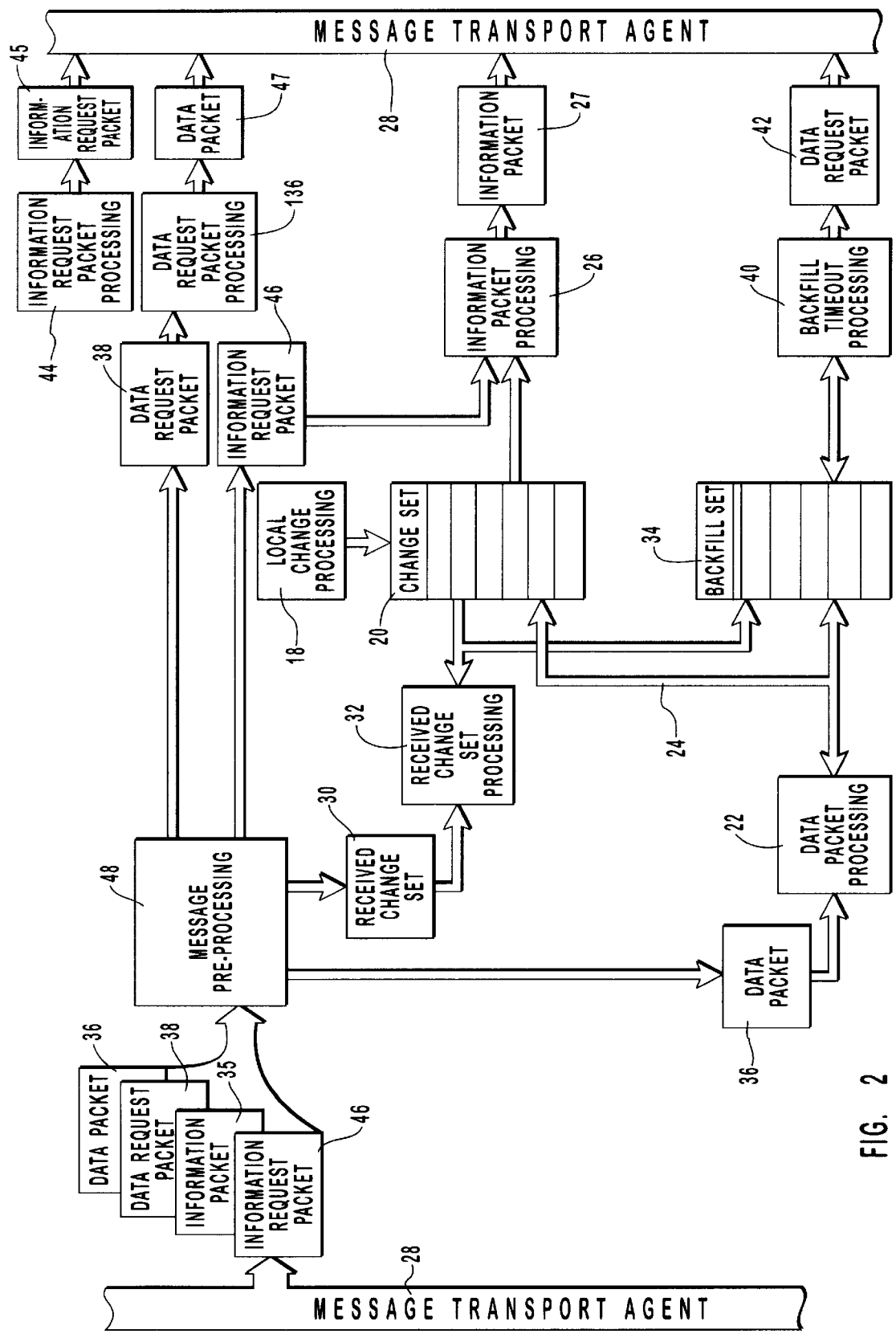
FIG. 2 is a flow diagram illustrating the discovery based data recovery system of the present invention.

An overview of the discovery based data recovery process of the present invention is illustrated in FIG. 2. The process illustrated in FIG. 2 represents a method by which data missing from a replica at a local replica node may be quickly and easily discovered and recovered. In the discussion that follows, the present invention is described in relation to a general replica object. As previously described, this general replica object may either be the data set properties for one or more data sets or may be one or more data objects for a data set. The process is conceptually similar and no distinction need be made except where noted.

In accordance with the present invention, each replica node comprises means for storing a list of changes made to the local replica object. In FIG. 2, such means may comprise, for example, local change processing block 18 which stores local changes made to a replica object in change set 20. In particular, a change set is maintained for each replica object at the local replica node. By way of example, each local change may have associated with it a unique identifier. By assigning a unique identifier (sometimes called a "change number") to each change made to the local replica, changes may be tracked throughout the enterprise as more fully described hereafter. The process of assigning unique identifiers is described in Section C below.

As discussed in the summary of the store and forward replication process above, in a store and forward replication system, each replica node periodically transfers the new changes made locally to each replica object to all other replica nodes on the replica object distribution list for that particular replica object. If the replica object is a data object, then the replica object distribution list is the replica list for the data set. If the replica object is the properties for a data set, the replica object distribution list may include all replica nodes or one or more subgroups. The transfer of changes means that each replica node, therefore, can also comprise means for storing a list of changes received from other replica nodes. By way of example and not limitation, such means may comprise data packet processing block 22. As illustrated in FIG. 2 by data path 24, data packet processing block 22 can store the received changes in change set 20, which is also used to store a list of local changes. The details of data packet processing block 22 are described hereafter, but in general, data packet processing block ensures that the received changes are used to update the local replica object and tracks the received changes.

Although it is presently preferred that change set 20 comprise both changes made locally and changes received from other replica nodes, such an arrangement is not necessary and any method of keeping track of changes made locally and changes received from other replica nodes will work with the present invention.

In accordance with this invention, a list of changes representing the current state of the replica object is periodically broadcast to other replica nodes on the replica object distribution list. To facilitate this transfer for data objects, each replica node keeps a list, called a replica list, of all replica nodes that have a replica of a particular data set. One list is kept for each replica on the local replica node. In implementations where data set properties are replicated to less than all replica nodes, analogous distribution lists may also need to be kept. To accomplish the transfer, each replica node comprises means for sending to other replica nodes the local change set. By way of example, and not limitation, in FIG. 2 such means is illustrated by information packet processing block 26. Although the details of information packet processing block 26 are described in greater detail later, in general, information packet processing block 26 determines when an information packet should be sent to other replica nodes on the replica object distribution list and ensures that the local change set is sent to the other replica nodes on the replica object distribution list at least at some predetermined interval. Information packets, as for example information packet 27 of FIG. 2, contain at least the local change set. As further described hereafter, the means for sending the local change set may also comprise any mechanism that generates messages containing the local change set, which are sent to other replica nodes. By way of example and not limitation, the local change set can be included with any or all of information packet 27, information request packet 45, data packet 47, and data request packet 42.

In order to broadcast message packets, such as an information packet, to one or more other replica nodes, each replica node comprises means for broadcasting at least one-way, unacknowledged communications to one or more other replica nodes. By way of example, in FIG. 2 such means comprises Message Transport Agent (MTA) 28. As previously mentioned, MTA 28 can be any combination of networking hardware, control software, and physical communication links which allow at least one-way, unacknowledged communications from one replica node to the other replica nodes on the replica object distribution list. As change sets are received from other replica nodes on the replica object distribution list, they are saved for later reference.

In order to receive information broadcast to a particular replica node, each replica node comprises means for receiving at least one-way, unacknowledged communications, containing at least one received change set, from one or more other replica nodes. By way of example, such means comprises received change set processing block 32. As fully described in Section F below, received change set processing block 32 processes received change sets. Furthermore, as described in Section D below, such means may also include any processing block which receives messages, containing at least one received change set, from other replica nodes. By way of example, and not limitation, change sets may be received in any or all of data packet 36, data request packet 38, information packet 35, and information request packet 46.

As indicated above, messages are received via Message Transport Agent (MTA) 28 of FIG. 2. As previously mentioned, MTA 28 can be any combination of networking hardware, control software, and physical communication links which allow at least one-way, unacknowledged communications from one replica node to the other replica nodes on the replica list. Although reception of one-way, unacknowledged communications will generally be accomplished via the same communication system used to broadcast one-way, unacknowledged communications, they do not necessarily need to be the same. Since the methods and systems of the present invention are designed to work with any type of networking system capable of transferring at least one-way, unacknowledged communications, the broadcasting system and the receiving system can be totally separate.

When a change set is received, such as received change set 30 illustrated in FIG. 2, the replica node must determine if its current change set is in sync with the received change set. Each replica node, therefore, comprises means for comparing the received change set to the local change set. For example, in FIG. 2, such means for comparing comprises received change set processing block 32. In one aspect, received change set processing block 32 determines if a received change set contains changes not found in change set 20.

In accordance with the present invention, replication nodes can comprise means for storing changes missing from the local change set. For example, in FIG. 2, such means comprises received change set processing block 32. As previously described, in one aspect received change set processing block 32 compares received change sets with those changes which are reflected in the local replica object list and stored in change set 20. In FIG. 2, backfill set 34 provides a location to store those changes which have been identified as missing from change set 20. Thus, the union of change set 20 and backfill set 34 represent all changes either which have been previously identified as missing or which have already been made to the replica object. By comparing the received change set to this union, changes which are not stored in change set 20 or which have not already been identified as missing can be discovered.

In another aspect, received change set processing block 32 stores any further changes which are missing from the union of change set 20 and backfill set 34 into backfill set 34. When a replica node discovers changes missing from change set 20 and identifies changes needed to bring the replica up to date with respect to other replica nodes in the enterprise, the replica node requests the needed changes from one or more replica nodes having the needed changes. Thus, in accordance with the present invention, each replica node comprises means for requesting from other replica nodes data missing from the local change set. By way of example, and not limitation, in FIG. 2 such means comprises backfill timeout processing block 40. Details of backfill timeout processing block 40 are presented in detail hereinafter, but in summary, backfill timeout processing block 40 processes information saved in backfill set 34 which, as explained above, contains changes identified as missing from change set 20. Backfill timeout processing block 40, among other things, generates data request packets, such as, for example, data request packet 42, in order to request missing changes from one or more replica nodes in the enterprise. By requesting and receiving data packets from replica nodes having changes missing from change set 20, the local replica node is able to recover missing changes and bring the local replica object up to date.

In summary, in a simplified form as illustrated in FIG. 2, changes made locally are stored in change set 20 by local change processing block 18. Changes received from other replica nodes are also preferably stored in change set 20 by data packet processing block 22. Change set 20 is periodically broadcast to other replica nodes in various ways, including information packets created by information packet processing block 26. Other replica nodes periodically broadcast their change sets to the local replica node by various ways, including data packet 36, data request packet 38, information packet 35, and information request packet 46. The received change sets 30 and the local change set 20 are compared by received change set processing block 32 and any changes missing from change set 20 are identified and stored in backfill set 34. Backfill timeout processing block 40 uses backfill set 34 to generate data request packets 42 which request missing changes from other replica nodes having the proper changes.

From the preceding description, it is apparent that the discovery based data recovery system of the present invention will, over time, discover changes missing from the local change set and recover the missing changes in an efficient manner. The system described works particularly well in cases where data is flowing on a regular basis between replication nodes. In some instances, however, it may be useful to minimize the "discovery time" or the time it takes to discover the changes missing from the local change set. In order to minimize discovery time, embodiments in the scope of this invention can be provided with means for requesting from other replica nodes change sets stored at the other replica nodes.

By way of example, such means can comprise information request packet processing block 44. The details of this block are described below, but in summary, information request packet processing will request, at appropriate times, an information packet containing the change set for a particular replica object stored at one or more replica nodes. This is illustrated in FIG. 2 by information request packet 45. The designated nodes will respond with an information packet containing their change sets if the designated node has changes in its change set that are not contained in the requesting replica node's change set. In this way, the discovery time can be minimized.

C. Assigning Unique Change Identifiers

As previously discussed, the replica node can assign a unique ID to all changes made locally. This provides a way to uniquely identify changes as they are exchanged throughout the enterprise. If all changes are uniquely identified throughout the enterprise, a replica node which receives changes from other replica nodes can quickly and easily determine if that particular change is part of the local change set. Any method that generates ID values unique across all nodes in the enterprise can be used. For example, if the enterprise had synchronized clock values available, each ID value could be drawn from the globally synchronized clock or have the globally synchronized clock value as part of the ID. As another example, one of the nodes in the enterprise could be responsible for issuing ID values to all other nodes. Other methods could be developed, and any method will work. All that is required is the ability to distinguish one change made to a replica from another change made to a replica.

Although any method for assigning a unique ID value to changes made locally will work with this invention, one presently preferred method is to assign each replica node in the enterprise a unique replica node ID value. The replica node then concatenates this unique replica node ID value with a counter value that is incremented every time an ID value is assigned. Thus, the preferred unique ID has the form:

| replica node ID value | local counter value |
|---|---|

The replica node ID value is referred to as the Globally Unique ID (GUID). When concatenated with the local counter value, the resultant quantity is sometimes referred to as the Fast Unique ID (FUID). Since the GUID is unique, and the counter value is constantly incremented every time an ID value is assigned, the entire FUID value is unique. The local counter value is preferably large enough to avoid a short term rollover problem. However, when a rollover occurs, the problem of conflicting ID's can be prevented by assigning a new GUID to the replica node at the moment of rollover. More details of this method of assigning FUID values can be found in the copending Store and Forward Application, previously incorporated herein by reference.

D. Distribution of Change Sets

From the foregoing discussion, it should be readily apparent that the present invention presupposes that a replica node making local changes to a given replica object will send the changes to other replica nodes on the replica object distribution list for that replica object. Any method which ensures that changes made by one replica node are broadcast to other replica nodes on the replica object distribution list can be used. In one preferred aspect, this initial exchange of locally made changes is performed by the store and forward replication system which has been summarized herein.

Once this initial exchange takes place, however, the present invention then ensures that the exchanged information is reliably received. If any information is missing due to situations such as loss of a packet, adding a new replica or adding a new replica node to the enterprise, the present invention ensures efficient recovery of the lost information. In order to fulfill this role, a key aspect of this invention is the exchange, between replica nodes on the replica object distribution list for a given replica object, of change sets containing changes "owned" by that replica node. That is, either changes made locally or changes received from other replica nodes on the replica list.

Since change sets allow each replica node on the replica list to discover if their replica objects are current, in general it makes sense to send the local change set to other replica nodes on the replica object distribution list at least at some maximum periodic interval. It is currently preferred, although not necessarily required, that a replica node also send the change set for a particular replica object in every message packet sent to other replica nodes on the object distribution list. To ensure that change sets are sent at least at some maximum periodic interval, the replica node can have a default time schedule where the change set will be sent if no other communication occurs within that time frame. Finally, as described hereafter, there are cases where it makes sense to stop sending change sets.

This preferred embodiment distributes change sets in one of four ways:

1. change sets are distributed via data packets sent as part of whatever replication process is employed to replicate data to replica nodes on the replica object distribution list;
2. change sets are distributed via data request packets sent to request data from other replica nodes;
3. change sets are distributed via information packets sent periodically to all replica nodes on the replica object distribution list for a particular replica object; and
4. change sets are distributed via information request packets sent to request change sets from other replica nodes.

With regard to the first item above, the data packets are, strictly speaking, part of the replication process and not part of the discovery based data recovery process of the present invention. However, the discovery based data recovery process can employ whatever replication process is used to its own advantage by including, in the data packets, the local change set. This is a preferred embodiment, but is not strictly necessary. If change sets were only sent out via special messages on a periodic or other schedule, the discovery based data recovery method would still work. The likely result, however, would be to slow the discovery process by increasing the discovery time.

The third and fourth items above are described in greater detail under the sections discussing information packet processing (Section F) and information request packet processing (Section J) below.

In addition to the above methods of distributing change sets, other methods could also be developed. For example, change sets could also be distributed by including them in a data request packet, such as data request packets 38 and 42 of FIG. 2. In short, any message sent to other replica nodes may include a change set.

From the above description of the preferred embodiment, because change sets are distributed via a wide variety of messages, any processing block which processes these received messages can properly be classified as means for receiving one-way, unacknowledged communications containing at least one change set. Similarly, any processing block which sends messages to other replica nodes can properly be classified as means for sending the local change set. Finally, any processing block which requests messages containing at least one change set can be properly classified as means for requesting, from other replica nodes, change sets stored at the other replica nodes.

E. Message Preprocessing

When packets are received from the MTA, initially the packets are examined to determine what type of packet has been received, and the packet is passed to the appropriate processing block. In FIG. 2, this processing is indicted by message preprocessing block 48. Message preprocessing block 48 performs two major functions. The first function is to determine which type of packet has been received and to pass the packet to the appropriate processing block. The second major function is to determine whether the received packet contains a received change set. If so, then message preprocessing block 48 strips the received change set from the packet and passes the received change set to received change set processing block 32.

Figure 3:
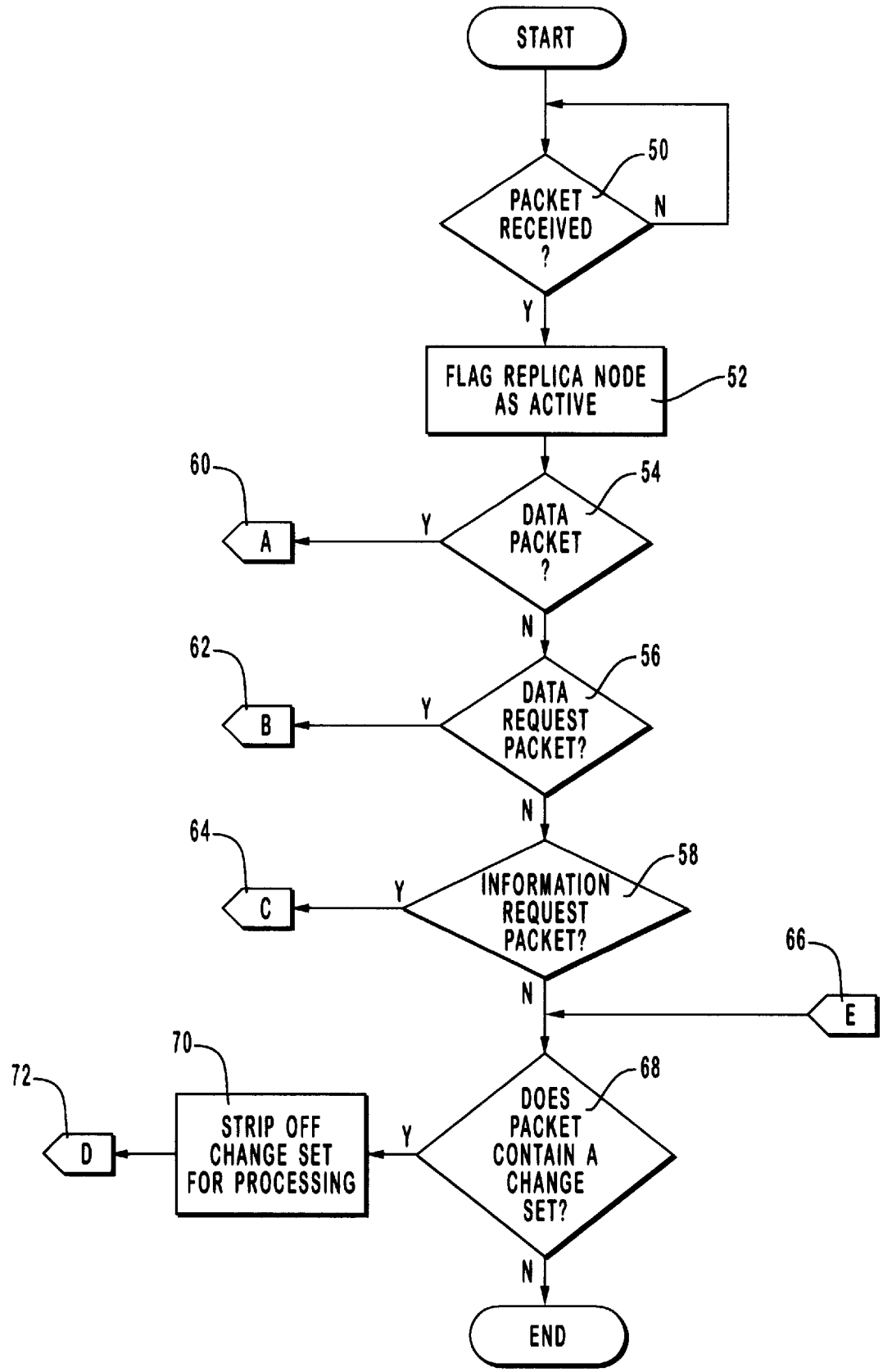
FIG. 3 is a flow diagram of packet preprocessing in the present invention.

FIG. 3 contains a more detailed flow diagram of message preprocessing block 48. As indicated in FIG. 3, message preprocessing block performs no function until a packet has been received. This is indicated in FIG. 3 by decision block 50.

Once a packet has been received, the first step is to mark the replica node which sent the packet as active if the replica node has previously been marked as inactive. This is necessary, as will become apparent later, because if replica nodes do not respond when expected, they are marked as inactive and no requests will be sent to them until they are marked as active again. Since a packet has been received from the sending replica node, the sending replica node is active and available to fill requests. This process is indicated in FIG. 3 by step 52.

The next three decision blocks in FIG. 3 determine whether the received packet is a data packet, a data request packet, or an information request packet. These decisions blocks are labeled in FIG. 3 as decisions block 54, 56, and 58, respectively. If the appropriate packet has been received, then processing is transferred to the appropriate processing block. This is indicated in FIG. 3 by off page connectors 60, 62, and 64. Processing of these packets will be discussed under the appropriate section below. If the received packet is an information packet, processing will continue at decision block 68, discussed below.

Processing returns to FIG. 3 at off page connector 66. As will become apparent below, this off page connector returns processing to this point after a data packet, data request packet, or information request packet has been processed. Conceptually, processing is returned to this point in order to ascertain whether any of the received packets contain a change set. This is indicated in FIG. 3 by decision block 68. If the packet does not contain a change set, processing for that packet is terminated, or more particularly, the process returns to the start and awaits the arrival of another packet.

If, however, the received packet does contain a change set, then the change set is removed from the data packet and sent to received change set processing block 32 for processing. This is indicated in FIG. 3 by step 70 and off page connector 72.

In the case of information packets received from other replica nodes, decision block 68 will detect that the packet contains a change set and the change set will be removed from the packet for further processing as described in Section G below.

Although the above diagram is presented as sequential processing steps, in today's multi-tasking, multi-threaded environments many tasks can be executed in parallel. In this disclosure, no attempt has been made to identify which tasks can be executed in parallel. Such implementation details are known to those of skill in the art. The focus of this disclosure, rather, is to set out conceptual processing which occurs in the preferred embodiments.

The above implementation has laid out a processing scheme that essentially processes the packets as they are received. Such a scheme works fine when all packets can be processed before the next packet arrives. If, however, another packet may arrive before the first is processed, it may be desirable to save the incoming packets in a store or queue until they can be processed. Furthermore, if multiple packets are to be stored before they are processed, more efficient processing may result if the packets are processed on a priority basis rather than on a first come basis. Embodiments within the scope of this invention may therefore comprise means for storing incoming packets until they can be processed. Embodiments within the scope of this invention may also comprise means for prioritizing the processing of incoming packets. By way of example, and not limitation, such means can comprise message pre-processing block 48 of FIG. 2. The flow diagram of FIG. 3 could be modified to incorporate such functionality by replacing decision block 50 with one more blocks that store the packets as they come in and then prioritize the packets prior to processing. Such a scheme can be implemented by storing incoming packets in an incoming packet store, and then before processing the next packet, scanning the incoming packet store for the next highest priority packet.

In one preferred embodiment, packets are processed in the following priority (highest to lowest): Requests to supply missing data (data request packets), requests for the local change sets (information request packet), data packets containing data sets properties, data packets containing data objects, information packets containing the change sets from other replica nodes. Setting the priority of processing may be a function of factors relating to data replication as well as factors relating to the recovery of data. For instance, from the standpoint of data recovery in most implementations it probably does not matter if data packets containing data set properties are processed first or packets containing data set objects are processed first. However, some replication implementations may be more efficient if the needs of replication of data and recovery of missing data are considered concurrently. For example, when hierarchical data is replicated it is desirable to process data packets containing data set properties before data packets containing data objects. More information about the replication of hierarchical data can be found in copending U.S. patent application Ser. No. 08/679,209, entitled "System and Method for the Distribution of hierarchically Structured Data in a Store and Forward Replication Process" (hereinafter the "Hierarchical Data Replication Application"), incorporated herein by reference.

F. Information Packet Processing

As described in Section B above, the information packet processing, illustrated by information packet processing block 26 in FIG. 2, ensures that the local change set is sent to the other replica nodes on the replica list at least at some predetermined maximum interval. Also, as illustrated in FIG. 2 by received information request packet 46, information packet processing block 26 determines when an information packet should be sent in response to a received information request packet.

An information packet comprises the local change set and preferably contains at least:

| Replica node ID | Change Set | Data Set ID |
|---|---|---|

The replica node ID is an ID which uniquely identifies the sending replica node across the enterprise. Any type or form of ID will suffice as long as the ID can uniquely identify the replica node among all other nodes in the enterprise. By way of example, the replica node ID can be a GUID described in Section C above.

The data set ID is an ID which uniquely identifies the data set corresponding to the change set being sent. This ID is used by replica nodes receiving the packet to determine which change set has been received. Again, any type of ID which uniquely identifies the data set across the network can be used. For example, the data set ID can be a FUID generated as described in Section C above.

Throughout this application the information included in the various packet types is the minimum amount desired to accomplish data recovery according to this invention. However, any implementation of a replication process will most likely have other components in addition to components to replicate data and recover missing data. Such components may include a component to resolve conflicts which arise between different copies of the same replica object, components to administer where the replica objects reside, components that deal with specially structured data such as hierarchically structured data, and components to handle expired data. Some or all of the other components may require additional data to be included in any or all of the packet types. An example of conflict resolution components can be found in copending U.S. patent application Ser. No. 08/673,161, entitled "System and Method for Distributed Conflict Resolution Between Data Objects Replicated Across a Computer Network" (hereinafter the "Conflict Resolution Application"), incorporated herein by reference. An example of administration of replica objects can be found in copending U.S. patent application Ser. No. 08/679,054, entitled "Replica Administration Without Data Loss in a Store and Forward Replication Enterprise," incorporated herein by reference. An example of components that deal with hierarchically structured data can be found in the copending Hierarchical Data Replication Application, previously incorporated by reference. An example of a component to handle expired data can be found in copending U.S. patent application Ser. No. 08/679,053, entitled "Time Based Expiration of Data Objects in a Store and Forward Replication Enterprise," (hereinafter the "Data Expiration Application"), incorporated herein by reference. Any such other components which are used in conjunction with the present invention should be consulted to identify any other data that should be included in these packet types.

Throughout this application, various messages sent and received are generally referred to as packets. This generic term is used to encompass all types of messages flowing between replica nodes in the enterprise. Throughout the discussion contained herein, messages are presumed to fit into a single physical transmission block. This, however, does not necessarily have to be the case. In fact, it is generally preferred that physical transmission blocks have a predetermined maximum size that will not be exceeded. If messages are too long to fit in a single physical transmission block, they should be split into as many blocks as necessary to transfer the data. Furthermore, in describing what minimum amount of data is transferred in a packet, it is presumed that the receiving replica node can tell what type of packet it is through the use of a header or some other identifying means. The details of these features are not critical to the invention and will not hereafter be specifically described.

Figure 4:
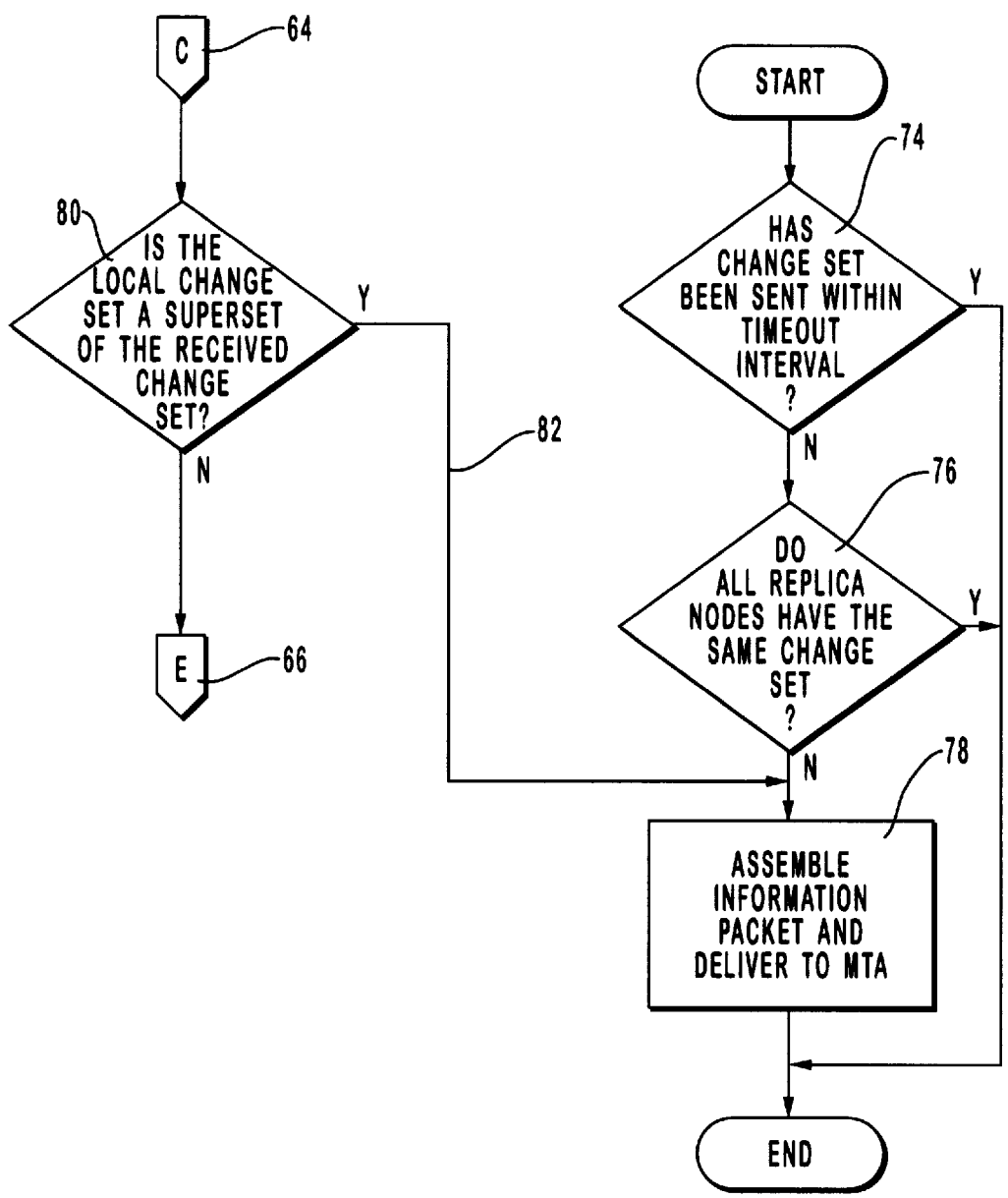
FIG. 4 is a flow diagram of information packet processing in the present invention.

Information packet processing block 26 is illustrated in greater detail in FIG. 4. As illustrated in FIG. 4, because of the dual role of information packet processing block 26 (FIG. 2), there are multiple processing paths. If an information request packet has been received, processing begins at off page connector 64 which is a continuation of off page connector 64 shown on FIG. 3. This processing path will be described in greater detail below. If, however, an information request packet has not been received, then the first step is to determine if an information packet should be sent to other replica nodes on the replica object distribution list.

When deciding whether to send out an information packet to other replica nodes, the first step is to decide whether the change set has been sent within a predetermined timeout interval. This is illustrated in FIG. 4 as decision block 74. As previously indicated above, the preferred embodiment of the present invention sends change sets out with most, if not all, communications sent to other replica nodes on the replica object distribution list. Thus, in this embodiment it does not make sense to send information packets containing the change set if the change set has been recently sent out. In an embodiment where change sets are only sent by information packets, then this decision block would be eliminated.

The timeout value can be any desired value, but is generally set at a fairly long interval such as 24 hours. This reflects the fact that in the preferred embodiment where change sets are sent out via several types of messages, information messages should only be sent when no other messages are sent that distribute change sets among replica nodes on the replica object distribution list.

If the change set has been sent to the other replica nodes on the replica object distribution list within the desired time frame, then the process is terminated and an information packet is not sent. If, however, the information packet has not been sent within the desired time frame, the process moves on to decision block 76 to determine if the other replica nodes need an information packet to be sent.

The fundamental purpose of information packets in the preferred embodiment is to distribute the change set when no changes are made to the replica for a long period of time. The distribution of change sets allows replica nodes to determine if they are missing any changes to the replica object. If, however, all replica nodes possess up-to-date replica objects, there is no need to send out change sets. Thus, if all nodes possess the same change set, information packets should not be sent. Decision block 76 tests this condition and terminates the process without sending an information packet if all replica nodes possess the same change set. As the change sets from other replica nodes are received, they are stored locally for later reference. When local change set 20 and all received change sets are the same, then no information packets need be sent.

If the change set has not been sent within the desired time frame and if all replica nodes do not possess the same change set, an information packet is assembled and delivered to the MTA for distribution as illustrated in step 78 of FIG. 4.

Returning now to what happens if an information request packet is received, attention is called to off page connector 64. As previously described, when message preprocessing block 48 (FIG. 2) determines that an information request packet has been received, processing continues at off page connector 64.

When an information request packet is received, the replica node must determine if it should respond with an information packet. This is accomplished by decision block 80 in FIG. 4. As described in conjunction with Section B above and in greater detail in Section J below, a replica node will respond to an information request packet if certain criteria are met. In the preferred embodiment, replica nodes respond if their change set is a superset of the change set received in the information request packet. In other words, information packet processing block 26 of FIG. 2 will respond with an information packet if the local change set contains changes not contained in the change set received in the information request packet. This is illustrated in FIG. 4 by branch 82.

If the local change set is not a superset of the received change set, processing continues at off page connector 66 in FIG. 3. This branch determines if the received change set contains changes not stored in the local change set. In this way the local replica node determines if the replica node requesting information has changes the local replica node does not.

G. Received Change Set Processing

Figure 5:
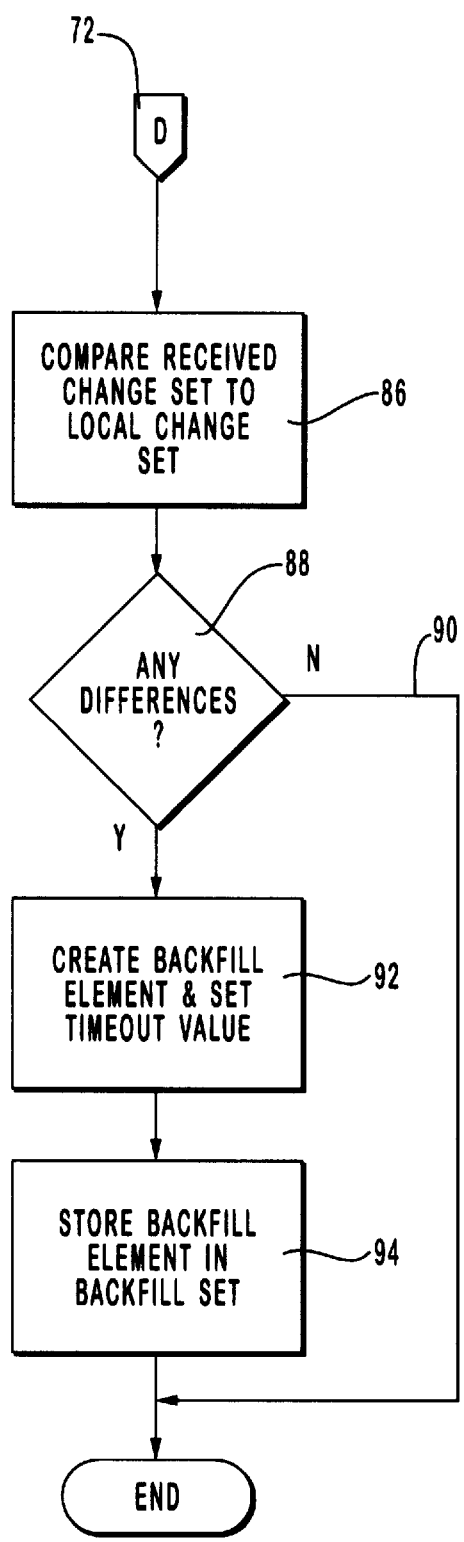
FIG. 5 is a flow diagram of received change set processing of the present invention.

Referring now to FIGS. 2 and 5, a discussion of received change set processing block 32 is now presented. As discussed in Section D above, in the preferred embodiment, change sets can be received from other replica nodes on the replica object distribution list in data packets, data request packets, information packets, and information request packets. This is illustrated in FIG. 3 by decision block 68 which tests all packets for received change sets. In each case, however, the processing for each received change set is the same and does not depend on how the change set is received.

In a preferred embodiment, one important characteristic of change sets broadcast to other replica nodes is that they contain all changes that have been made locally which have already been replicated out and changes which have been received from other replica nodes during the course of the replication. In other words, locally made changes are not included in the change set which is broadcast to other replica nodes until the changes have been broadcast to other replica nodes. This is important because, as discussed below, if change sets are broadcast which contain changes which have not yet been broadcast, every replica node receiving the change set would generate a backfill request for data which had not yet been broadcast. This would be very inefficient.

Details of received change set processing block 32 are presented in FIG. 5. In FIG. 5, processing begins with off page connector 72 which is a continuation of off page connector 72 of FIG. 3. As indicated by step 86 of FIG. 5, the first step in received change set processing is to compare the received change set (for example received change set 30 of FIG. 2) with the local change set (for example change set 20 of FIG. 2).

Section B above described the replica node as comprising means for comparing the received change set to the local change set. In FIG. 5, such means is represented, for example, by step 86. In more precise terms, in the preferred embodiment the received change set is compared to both change set 20 and backfill set 34. This identifies not only changes missing from change set 20 but also missing changes which were previously identified. As explained in Section C, each change preferably has associated therewith a FUID or other way of distinguishing one change from another change. Step 86 in FIG. 5 uses the FUID or other distinguishing features to compare the changes in change set 20 and backfill set 34 with received change set 30 and determine if received change set 30 has changes that are not found in the local change set 20 or backfill set 34.

As illustrated by branch 90 of decision block 80 in FIG. 5, if no differences exist, or more precisely, if the received change set does not contain any changes that are not already found in change set 20 or already identified in backfill set 34 of FIG. 2, the procedure is terminated. If, on the other hand, the received change set does contain changes that are not found in change set 20 or previously identified in backfill set 34, processing continues at step 92.

Section B indicated that replica nodes also comprise means for storing changes listed in received change sets but not listed in the local change set. In FIG. 5, such means is illustrated, for example, by step 92 and step 94. As explained previously, backfill set 34 (FIG. 2) provides a convenient location to store changes found in a received change set but not found in the local change set, as for example change set 20. Backfill set 34 thus comprises a list of changes that have been identified as missing from change set 20. It is presently preferred that an entry in backfill set 34 (called a "backfill element") comprise at least:

| changing range for missing changes | replica node ID | data request packet ID | timeout value |
|---|---|---|---|

In the above, the change range is a range of changes missing from the local change set. A change range is represented by a lower and upper change number and, in the preferred embodiment, is interpreted as inclusive of the lower and upper change numbers. In this case the change range is represented by a smallest missing change number and a largest missing change number. The smallest missing change is the FUID or other identifying feature of the smallest change missing from change set 20. The largest missing change is the FUID or other identifying feature of the largest change missing from change set 20. When the local replica node requests the missing data from another replica node having the missing data, the identification of that node is stored in the replica node ID field. Initially it is preferred that this value be set to a null value for reasons discussed in greater detail in Section H below. The data request packet ID is used to track multiple packet answers and is further discussed in Section H. Finally, a timeout value is stored which represents the time at which to perform the next action.

Returning now to FIG. 5, step 92 indicates that when changes are listed in the received change set 30 but not listed in change set 20 or backfill set 34, a backfill element is created. When the backfill element is created, step 92 indicates that a timeout value is set. This timeout value initially indicates the time that the backfill element will remain in the backfill set before it is processed and used to generate a data request message, although it is also used for other purposes as explained in Section II below. Use of a timeout value to delay generation of a data request packet is preferred, but not strictly required in the present invention. Initially this timeout value is set to a fixed value that is dependent upon the type of physical connections used by the MTA to send and receive messages. For example, if the replica node is connected to other replica nodes in a common site and those nodes can supply the missing data, the timeout value can be relatively low, for example, 15 minutes. If, however, the replica node is connected to other replica nodes by a slower connection and those nodes will supply the missing data, a longer timeout value is used, for example, 1 hour.

Use of a timeout value to delay generation of a data request message is preferred for two reasons. First, because of different routing delays in the underlying physical network, one replica node may receive a change through the network before another replica node. By delaying generation of a data request packet for a period of time, any messages already sent but not yet received will have a chance to be received. Once they are received, the need to generate a data request packet may be obviated.

The second reason that delaying generation of a data request packet is preferred is because by delaying data request packet generation, perhaps more change sets indicating the needed information is available from other replica nodes will be received. This gives the local replica node more nodes to choose from when selecting which replica node will be asked for the missing data. Details of the replica node selection criteria are presented in section H.

Returning now to FIG. 5, once the backfill element has been created and the proper timeout value set, the backfill element is stored in backfill set 34 in FIG. 2. This is illustrated in FIG. 5 by step 94.

H. Backfill Timeout Processing

Figure 6:
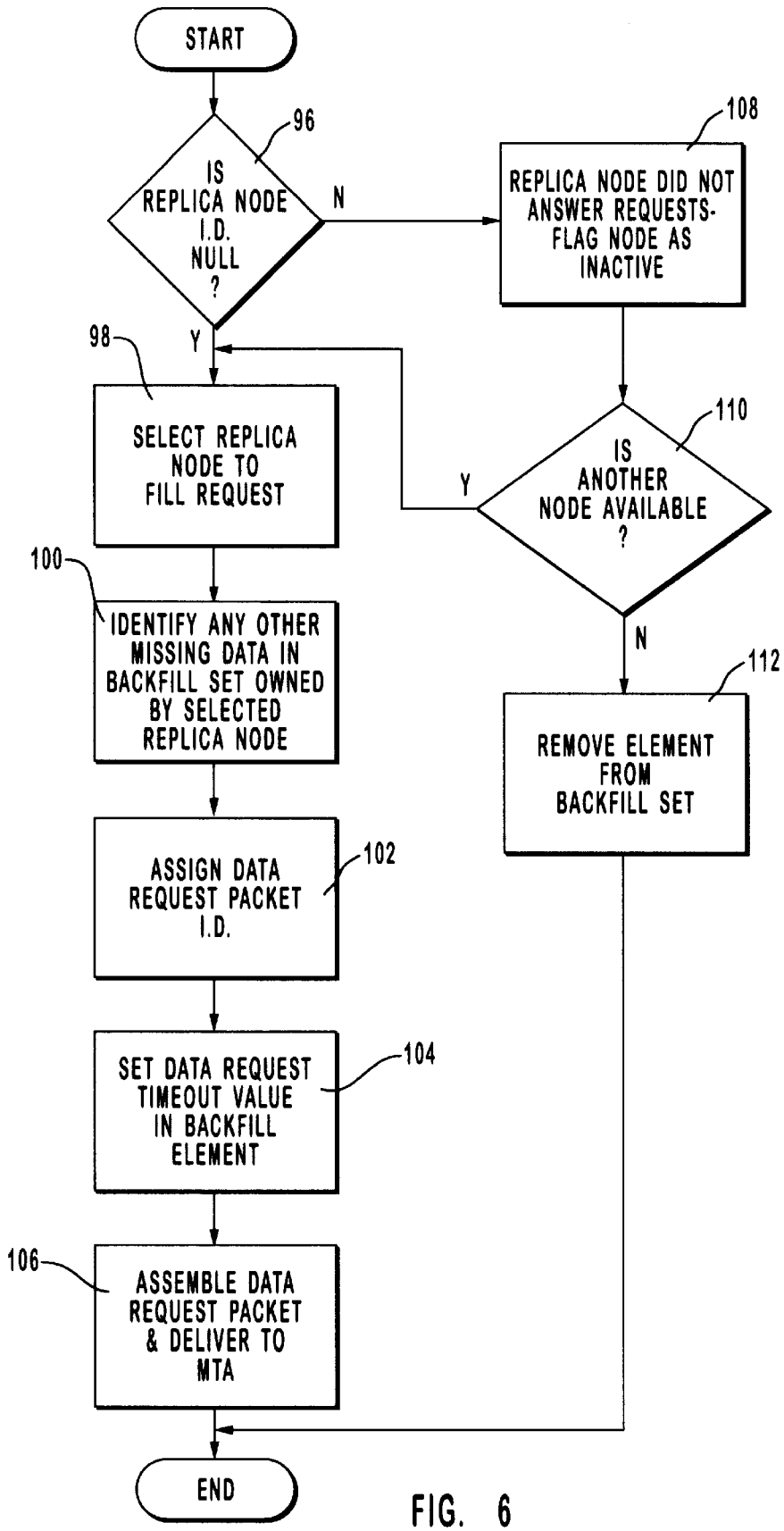
FIG. 6 is a flow diagram of data packet processing of the present invention.

Turning next to FIGS. 2 and 6, a more detailed discussion of backfill timeout processing block 40 of FIG. 2 is presented. Once changes have been identified as missing, the missing changes can be requested. Thus, embodiments within the scope of this invention can comprise means for scheduling requests for data missing from the local change set. As described in the previous section and in this section, scheduling a data request at some future time provides several benefits including reducing unnecessary network traffic. By way of example, and not limitation, the means for scheduling requests for data can comprise backfill timeout processing block 40 (FIG. 2). Although the process of scheduling data requests through timeout values as described below is preferred, other ways of achieving the scheduling function could also be employed.

As discussed in Section B above, backfill timeout processing block 40 processes information saved in backfill set 34 and, among other things, generates data request packets. In the preferred embodiment, the process is started when the timeout value in one or more of the backfill entries in backfill set 34 is reached.

Turning now to FIG. 6, the first step when the process is started is to check the replica node ID value. This is represented in FIG. 6 by decision block 96. As discussed in Section G, the replica node ID value is preferably set to a null value when a backfill entry is first created and stored in backfill set 34. Thus, if the timeout value is reached and the replica node ID value is null, timeout processing block 40 knows that the initial time delay value first entered into the backfill element when it was created has arrived and it is time to generate a data request packet. Under these conditions, execution continues to step 98.

As indicated in step 98 of FIG. 6, the first item to consider when generating a data request packet is to select which replica nodes will receive the data request packet. When the replica node has more than one replica node on the replica object distribution list with the needed information, the replica node must decide which replica node on the list should provide the missing changes. Thus, each replica node may be provided with means for selecting which replica node will be used to fill a request for data missing from the local change set. In FIG. 6, this means is indicated by step 98. In the present preferred embodiment only one node is selected to receive a data request packet. However, multiple nodes could be selected for reliability reasons. Although the node selection process described below is preferred, it is not the only way to implement such means. In particular, in various applications, various factors may be more or less important than the factors described below.

The replica node selection criteria selects one or more replica nodes which can best supply the missing data as defined by the change range in the backfill element. The preferred selection criteria is also designed to fulfill two goals. The first is to minimize the cost to obtain the changes and the second is to balance the burden of fulfilling such requests among all nodes on the replica list as much as possible. Thus, the node selection criteria may be provided with means for minimizing the cost needed to receive missing data and means for balancing the data requests among several nodes.

In the context of the present invention, cost is a general term used to encompass those factors which are important in the node selection criteria. For example, cost may include, but is certainly not limited to, factors such as the time needed to obtain data from a node, the monetary cost of obtaining data from a node, or the reliability of a node in providing data. Other administrative factors may also be included. The relative cost is indicated in the preferred embodiment by an "affinity" value associated with each node. In this scheme, affinity values represent the site-to-site cost for transferring data from one site to another. In the preferred embodiment, affinity values are generally assigned by a system administrator and all nodes at a particular site usually have the same affinity value. Nodes local to a site will usually have a 0 affinity value (most favorable) and nodes at an expensive, slow, or unreliable site will usually have a high affinity value. As seen below, affinity values used in this manner allow system administrators to tailor the behavior of nodes when requesting missing data. In addition, other embodiments could use dynamic affinity values that are updated automatically by the system.

The first step of the replica node selection process determines the replica nodes eligible for consideration. Only those replica nodes on the replica object distribution list for the particular replica object at issue are eligible. Further, only those replica nodes whose stored change sets indicate that they have the missing data and which are not flagged as inactive are eligible for consideration. Because the change sets received from other replica nodes are stored, the local replica node can search the stored list for nodes which have the needed changes.

Once the list of eligible replica nodes is assembled, then nodes are selected based on the following prioritization criteria which encompasses both means for minimizing the cost incurred in receiving missing data and means for balancing the data requests among the servers. The implementation of the this means is described below and is given by way of example and not limitation.

Since replica nodes from the same site as the local replica node are always assumed to provide faster response than replica nodes from other sites, replica nodes from the local site are selected first. Of those replica nodes in the local site, if the replica nodes have their own internal priority, then those nodes are selected. If the replica nodes do not have their own internal priority, then the nodes are selected seriatim. Use of these priority measures balance the load among replica nodes.

If there are no nodes in the local site which have the needed data, nodes with the lowest affinity values are selected next. Recall that affinity is a measure of the cost to access data from a node and is typically assigned by a system administrator. Again, if several nodes have the same affinity, the load should be balanced by selecting them seriatim or through the use of some other priority mechanism.

Since affinity is usually assigned by an administrator in the preferred embodiment, care must be taken to handle situations where no affinities have been assigned. If no replica nodes having an assigned affinity value are available, replica nodes are selected based on their average weighted transmission time, with the smallest weighted transmission time having the highest priority. Transmission time is the one-way time to send a packet from one node to another. The weighted transmission time for a replica node is updated for each replica node each time a packet is received from the replica node. The weighted transmission time is computed by taking 50% of the currently measured transmission time and adding it to 50% of the prior weighted transmission time. In mathematical terms:

$$T_n = 0.5 * T_c + 0.5 * T_{n-1}$$

Where:

$T_n$ is the current value of the weighted transmission time;

$T_c$ is the currently measured transmission time; and $T_{n-1}$ is the prior value of the weighted transmission time.

Obviously, many other schemes for selecting nodes based on cost could be developed. For example, the system could include an algorithm which periodically updates an appropriate cost function. Selecting nodes according to the selected cost function would then emphasize the factors used in the cost function.

Returning now to FIG. 6, after the replica node has been selected, the next step is to identify any other missing data in the backfill set which is owned by the selected replica node and which has not yet been requested. This is illustrated in FIG. 6 by step 100. Because a data request packet will be sent to the selected replica node requesting the missing data in the backfill element whose timeout value triggered backfill timeout processing block 40, other unrequested missing data in the backfill set which has not yet reached its timeout value but can be supplied by the selected replica node can also be included with the data request message. Although such a process is not required by the present invention, it is preferred since this approach servers to minimize backfill time and to reduce the network traffic.

Where:

$T_o$ is the timeout value;

$T_q$ is the time the request will spend in the queue of the replica node filling the data request before it is sent by the MTA;

$T_p$ is the time the replica node filling the request will spend sending one data packet in response to the request;

$T_t$ is the weighted transmission time calculated as described above; and $T_f$ is a variable time added to the timeout value to account for unpredictable effects. This value is typically defined as 50% of the transmission time but it can be bounded by minimum and maximum values to keep the time reasonable.

The final step in the process of sending a data request packet is to assemble the data request packet and deliver the packet to the MTA. This is illustrated in FIG. 6 by step 106. A data request packet preferably has at least the following data:

| replica node ID | data request packet ID | requested change ranges | local change set | data set ID |
|---|---|---|---|---|

In accordance with the invention, unrequested missing data may also be selected for inclusion with a data request packet based on other limiting criteria such as allowing the timeout counter to reach a certain level before including the data in the packet. Furthermore, it may not be profitable to request missing data from a node in a different site if such data can be obtained from a node in the local site. Finally, only partial change ranges may be requested, if desired.

After any other missing data which is to be included in the present data request packet has been identified, the next step is to assign data request packet IDs to the appropriate backfill entries. This is illustrated in FIG. 6 by step 102. The data request packet ID should be unique and any method which generates unique IDs will work. This value may, for example, be a FUID generated as described in Section C. The data request packet ID allows the backfill elements to be associated with received data packets. This is important because, as seen hereafter, this allows the timeout value associated with requested data to be updated when only a portion of the data is received. Such an approach prevents the timeout value of a backfill element from being reached when data is still coming in.

The next step in the process is illustrated in FIG. 6 by step 104 which sets the timeout value in the backfill element. When a data request packet is sent to a replica node, a mechanism needs to be in place to detect inactive replica nodes. Otherwise a replica node which requests data will wait forever to receive data from a replica node that has left the enterprise. The timeout value is computed as follows:

$$T_o = T_q + T_p + 2 * T_t + T_f$$

The replica node ID is the ID of the replica node requesting the data. The data request packet ID has been explained above. The requested change ranges are the range of changes missing at the requesting replica node and, as previously described, may represent more than one backfill element. As previously described, the local change set is preferably always sent with a communication and so is shown above. Finally, the data set ID identifies which data set corresponds to the local change set.

Returning to FIG. 6, the sequence of events when the replica node ID is not null when the timeout value is reached is now examined. Simply put, if the timeout value is reached and the replica node ID is not null, then a data request packet has been sent to a replica node asking for missing data and the replica node failed to respond in the expected time frame. Under these conditions, the replica node is marked as inactive. In order to prevent replica nodes from utilizing inactive replica nodes, each replica node may be provided with means for identifying inactive replica nodes. In FIG. 6, such means is illustrated by step 108. Any mechanism which designates a node as inactive may be used. For example, an inactive indication may be kept with the replica object distribution list. Such a scheme, however, may result in storage of redundant data. If the same replica node were on several different replica object distribution lists, then each list would mark the same node as inactive. It is, therefore, preferred to store a list of inactive replica nodes separately. Other mechanisms may also be used.

When a node is marked as inactive, no further requests will be sent to that replica node until the node is marked again as active. A node is marked active whenever any packet is received from that node. In the preferred embodiment this takes place, as described above, at step 52 of FIG. 3.

When a data request goes unfilled because the selected replica node does not respond, another node is selected to fill the request, if possible. This is illustrated in FIG. 6 by decision block 110. If another node is available to fill the request, node selection and data request message transmission occur, as previously described.

If another replica node is not available to fill the request, the element is removed from the backfill list and the process is terminated. This is illustrated in FIG. 6 by step 112. Note that when another packet is received which has a change set containing the changes in the deleted backfill element, it will again be added to the backfill list and scheduled for data request as previously described.

I. Received Data Packet Processing

Figure 7:
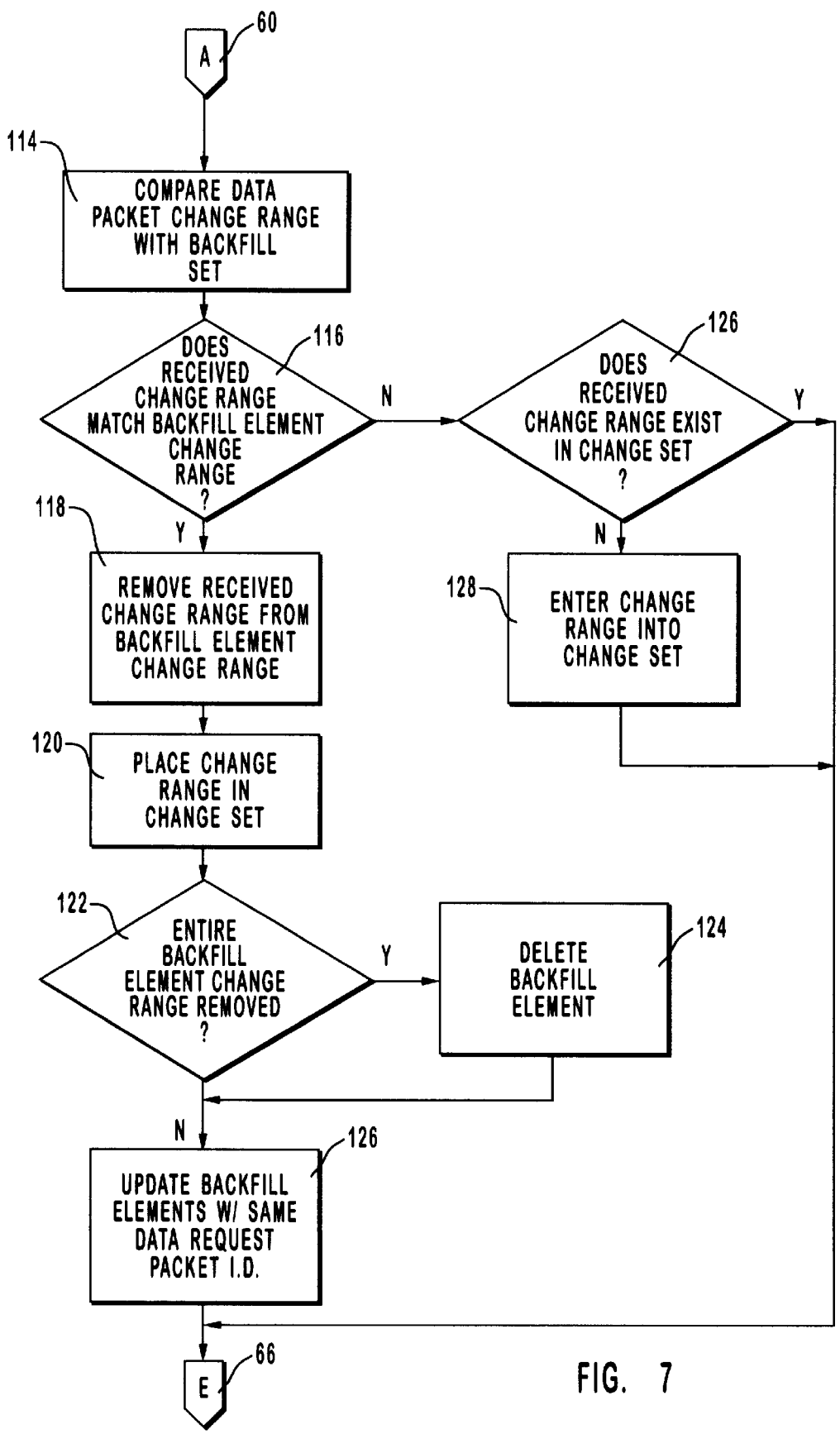
FIG. 7 is a flow diagram of backfill timeout processing in the present invention.

Turning next to FIGS. 2 and 7, details of data packet processing block 22 in FIG. 2 are presented. In presenting these details, the discussion will focus on how the discovery based data recovery system of the present invention utilizes and processes data packets. This is because data packets are, strictly speaking, part of the replication process. However, as previously described, the discovery based data recovery system can utilize data packets to its own advantage.

When a data packet, like for example data packet 36 of FIG. 2 is received, the data packet may contain data generated from one of two events. The first event is that the data packet has been sent in response to a data request packet. In this case the data packet will contain data listed in the backfill set because it was specifically requested. (This statement is only true, of course, if a data packet also containing the requested information was not previously received in the normal course of replication.)

The second event that generates data packets is the normal replication process. In this case, the data in the data packet may potentially be found in the backfill set, but it also may simply be new changes that are not yet known at the local replica node or changes already known at local replica node. In either case, because the discovery based data recovery process is utilizing data packets to its own advantage, data packet processing block 22 must properly handle the received information.

A data packet preferably has at least the following information:

| replica node ID | data set ID | change range | replica objects | change set |
|---|---|---|---|---|

The replica node ID is the ID of the replica node sending the data packet. This may be a GUID, as previously explained in Section C. However, any unique ID will work. The data set ID is an identifier that allows the replica nodes to identify the proper data set for data objects or may be an ID which identifies the data packet as containing data set properties. This ID can be a FUID as described in Section C above. Again, however, any identifier that will allow the replica object to be identified among the various replica objects owned by a replica node across the enterprise is sufficient. The change range is the range of changes associated with the replica objects in the data packet. The replica objects field comprises one or more data objects which make up the replica or one or more data set properties, depending on whether the data packet is replicating data objects or data set properties. The data objects can be any type of data and may be similar, such as a group of spreadsheets, or may be dissimilar, such as a word processing document, a data file, a spreadsheet and a folder containing a plurality of mail messages. The data set properties can be any properties necessary or desirable to describe a data set. Only those replica objects that are the subject of the changes in the change range are included. Finally, since the discovery based data recovery process is using the data packets to its own advantage, the change set of the replica node sending the data packet is included.

Referring now to FIG. 7, when a data packet is received, processing begins at off page connector 60 which is the continuation of off page connector 60 in FIG. 3. As illustrated in FIG. 7, the first step is to compare the received change range with the backfill set, as for example backfill set 34 in FIG. 2. In FIG. 7, this is illustrated by step 114. This step is performed to determine if the data packet contains information requested from backfill set 34. Decision block 116 and the steps which follow indicate that if the change range received in the data packet matches one or more backfill elements, the received change range is removed from backfill set 34 and added to the change set, for example, change set 20 in FIG. 2. This is shown in FIG. 7 by steps 1 18 and 120 respectively.

Note that the received change range may be an entire change range of a backfill element or may be a subset of the change range. In order to decide which case exists, decision block 122 is next performed. As indicated by step 124, if the entire backfill change range has been received and removed from backfill set 34 in FIG. 2, the entire backfill element has been received and the element is deleted from backfill set 34. If the entire backfill change range has not yet been received, the backfill element must remain in backfill set 34. In this case, the backfill element change range is updated to reflect the portion of the change range that was received.

The replication process may also have specific requirements on how incoming data packets are processed. These functions must also be performed before the received changes are "owned" by the receiving replica node. For example, the copending hierarchical Data Replication Application, previously incorporated by reference, details specific processing sequences to deal with hierarchically structured data.

After the appropriate change range has been removed from backfill set 34 and added to change set 20 of FIG. 2, the next step is to update the timeout value for all remaining backfill elements which have the same data request packet ID. Updating the timeout value for all backfill elements with the same data request packet ID always occurs even if there are no backfill elements that apply to the change range received. This is illustrated in FIG. 7 by step 126. The purpose of this step is to prevent the timeout value from expiring before the replica node responding to a data request has had time enough to fill the entire request.

The fact that a data packet has just been received means that the replica node is not inactive. The fact that the entire change range was not received means that more than one data packet will be required to finish filling the request. The replica node should, therefore, be given another block of time to finish filling the request. The way in which a replica node responds to requests is covered in greater detail in Section K below.

After step 126, off-page connector 66 indicates that execution continues at off-page connector 66 of FIG. 3 to process the change set received as part of the data packet. Processing of the change set proceeds as previously described in Section G.

Returning to decision block 116 of FIG. 7, if the received change range does not match any change range in backfill set 34, then the received data packet changes are either known or are new and unknown. Distinguishing between these last two cases is performed by decision block 126. Decision block 126 determines whether the received change range already exists in the local change set, as for example, in change set 20 of FIG. 2. If the change range exists in change set 20, then the received changes are already known and processing continues, as indicated by off-page connector 66, at off-page connector 66 of FIG. 3.

If the change range received in the data packet does not exist in change set 20, then the change range is new and unknown. The next step is to then enter the change range in change set 20 as indicated by step 128. Again, processing of the received change set takes place as indicated in FIG. 3 beginning with off-page connector 66.

As indicated above, FIG. 7 and the description of data packet processing block 22 does not describe how the received replica objects are processed. Processing of the replica objects, strictly speaking, lies in the realm of the data replication process, such as the data replication process described in the copending Store and Forward Application, previously incorporated herein by reference. For the purposes of this invention, all that is required is that the received replica objects are processed in such a way that the replica object list is brought up-to-date and contains the most current replica objects. Additional information regarding the processing of replica objects can be found in the copending Store and Forward Application, the copending Hierarchical Data Replication Application, and the copending Conflict Resolution Application, all previously incorporated herein by reference.

J. Information Request Packet Processing

Figure 8:
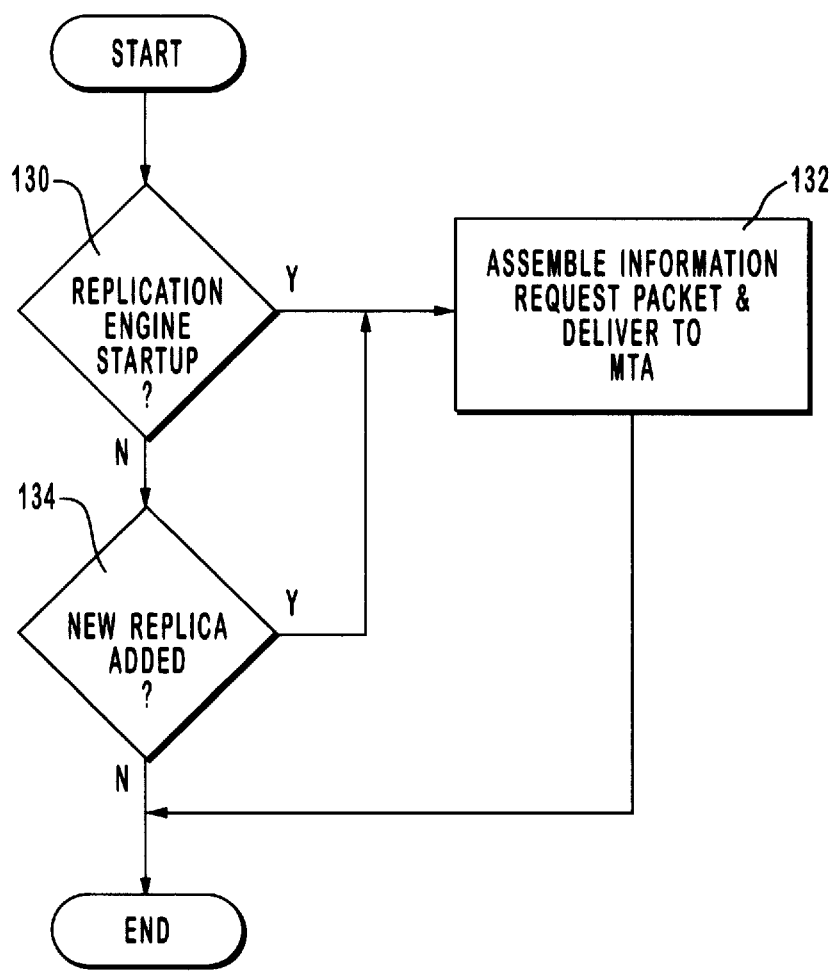
FIG. 8 is a flow diagram illustrating information request packet processing.

Turning next to FIGS. 2 and 8, a discussion of information request packet processing block 44 of FIG. 2 is presented. As previously discussed, information request packets request change set information from one or more replica nodes on the replica object distribution list for a particular replica object. Although information request packets are not required in the present invention, they are preferred to ease the process of adding replication nodes or replica objects to an enterprise.

An information request packet preferably contains at least the following information:

| replica node ID | one or more change sets | one or more replica object IDs |
|---|---|---|

The replica node ID is the ID of the replica node making the request. As previously described, any unique ID will work, as for example, a GUID as explained in Section C. Attached to the information request packet is one or more change sets along with their respective replica object ID values. These change sets are the local change sets for the local replica objects. As previously described, for each replica object (either data set properties or data sets) a replica node may keep a change set and a replica object distribution list. More than one change set may be attached to the same information request packet (or any other type of packet) as long as the corresponding replica objects have the same replica object distribution list. By bundling change sets in this manner, message traffic is reduced.

As previously discussed in Section F, an information request packet is a request for the change set of one or more replica nodes that are responded to by the replica nodes receiving the request if certain criteria are met. Also, as described in Section F, a replica node will respond as long as the change set at the replica node is a superset of the change set in the information request packet. Thus, when information request packets are generated, they are typically broadcast to multiple replica nodes, perhaps even all replica nodes on the replica object distribution list, in order to increase the likelihood of a positive response.

Information request packets serve two basic purposes. The first purpose is to notify other replica nodes that the sending replica node is "active." The second purpose is to reduce the time necessary for a replica node to bring its replica object up-to-date by reducing discovery time. The process diagram illustrated in FIG. 8 shows a process which fulfills these purposes.

As shown in FIG. 8, decision block 130 first determines if the replication engine has just started. If so, then execution continues with step 132 which assembles the information request packet and delivers it to the MTA for distribution. When a replication engine is first started, the replica node has no information about what data sets are available for replication throughout the enterprise and which of the data sets should be replicated on the local replica node. Thus, when a replication engine is first started, the replica node must somehow discover which data sets should be replicated on the local replica node and must then take steps to obtain a replica of the appropriate data sets. Although any method accomplishing these two steps will work, in a preferred embodiment, the replica node first sends an information request packet to request the data sets available for replication throughout the enterprise and the replica list for each data set (eg., the data set properties for the data sets on the enterprise). Once the information is received, the local replica node has unpopulated data sets and can issue backfill requests to the appropriate replica nodes to obtain the desired data to populate one or more data sets. In this scheme, the initial information request packet may be of a special type and may be sent to every replica node in the enterprise. This allows all replica nodes to be aware of the existence of a new replica node.

This approach is particularly well suited to replication environments where the "properties" of data sets, such as a list of data sets available in the enterprise, are replicated separately from the data sets themselves. An example of such a replication environment is described in the copending Store and Forward Application. This application, incorporated herein by reference, discusses replication of data set properties in greater detail.

In addition to the above procedure on replication engine startup, other procedures may also be used. These procedures are usually tailored to the underlying replication method. For example, when a new replication engine is started, it may send one message to a designated node which then responds with a list of data sets that should be carried on the local replica node along with the appropriate replica lists. The local replica node can then send information request packets to the appropriate nodes requesting the local change sets for the appropriate data sets. Other methods may also be used. The important thing to realize is that the concept and operation of information request packets supports virtually any desired replication engine startup method.

If the replication engine is already started, decision block 134 is then executed. This decision block determines if a replica of a new data set has been added on the replica node or if a new replica node has been added to the replica list of an existing data set. In other words, if a new copy of a data set is added to the replica node, either because a new data set is being added to the enterprise or because a new replica node is being added to the replica list of an existing date set, then execution again passes to step 134 where an appropriate information request packet is assembled and delivered to the MTA for distribution to one or more replica nodes on the replica list. As explained before, this helps to reduce the time it takes the replica node to acquire an up-to-date replica by reducing the discovery time.

In addition to the conditions illustrated in FIG. 8 as producing information request packets, there may also be other situations which would benefit from reduced discovery time. However, in assessing the utility of adding those situations to the processing chart illustrated in FIG. 8, the utility should be balanced against the increased message traffic and processing load generated by issuing information request packets in those situations.

K. Responding to Requests

From the above description, it should be readily apparent that from time-to-time a replica node will be required to respond to various requests. The two requests identified above are the information request (received via an information request packet) and the data request (received via a data request packet). It is possible that the request will require transfer of more data than can fit in a physical transfer block. As previously discussed, when this is the situation, the packet will be split into multiple physical transfer blocks. These are received at the receiving replica node as multiple packets of the same type. There are some special circumstances that need to be considered when dealing with multiple packets which are sent in response to a single request. Some of these have already been discussed in Section H above in conjunction with the update of timeout values so replica nodes which are responding via multiple packets are not marked as inactive. In the discussion which follows, the example of responding to a data request packet is used to illustrate some of these issues. Realize, however, that the general approach described below will also work for any instance where a replica node responds to a single request via multiple packets.

Figure 9:
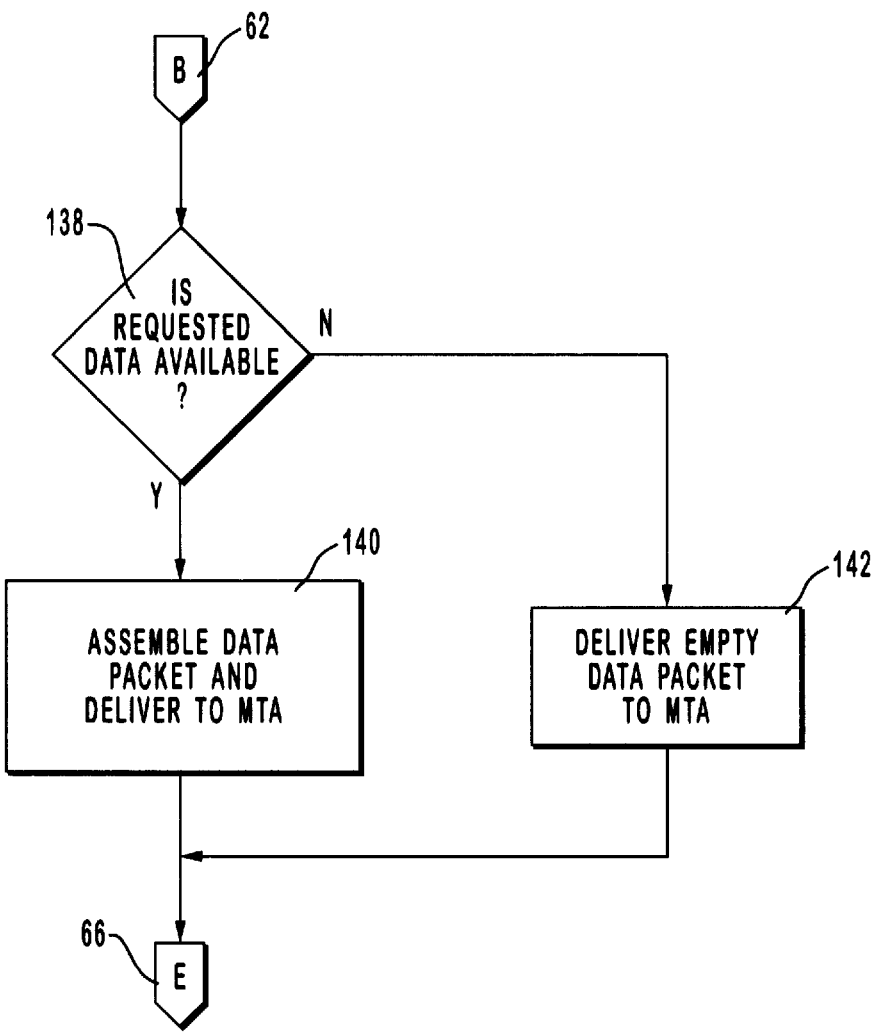
FIG. 9 is a flow diagram illustrating data request packet processing.

In FIG. 2, response to data requests is illustrated by data request processing block 136. The processing for data request packets is illustrated in FIG. 9. Data request processing block 136 first examines incoming data request packets to determine if the requested information is available. This is illustrated in FIG. 9 by decision block 138. As illustrated by step 140, if the requested information is available, data request processing block 136 assembles the appropriate information into a data packet and delivers the data packet to the MTA for delivery to the requesting replica node. The preferred minimum content of a data packet for data recovery purposes was previously discussed in Section I above. If the requested information is not available, data request processing block 136 responds with an empty data packet as illustrated by step 142 to indicate the requested information was not available. Processing then continues at off page connector 66 on FIG. 3.

A given replica node may, at any given time, be processing several requests of various types. In fact, at any given time, a replica node may be processing several data request packets. In order to accommodate more than one request, it is presently preferred that a queue of a fixed size be allocated to fill backfill requests received via data request packets. When the queue is full, it is also presently preferred that any additional requests be placed in a standby queue and added to the backfill queue as space becomes available.

When processing more than one backfill request, it is desirable that as many requests as possible be processed without causing any of the pending backfill requests to timeout at the requesting replica node. As previously explained, such an occurrence will result in the requesting replica node marking the replica node filling the request as inactive. Because of these goals, it is impractical for a replica node to completely fill one backfill request before beginning another. For example, if there were 100 pending backfill requests and each required 1 hour to process and fill, then if the requests had a 3 hour timeout value, only 2 of the backfill requests could be processed and filled before the remainder would timeout.

In order to avoid this condition, it is presently preferred that the replica node filling the backfill request time slice each backfill request. In other words, the replica node would work on each request for a short time slice before moving on to the next. It is presently preferred that the amount of time allocated to each backfill slice be dependant on the number of backfill requests pending in the queue. The larger the number of pending requests, the smaller the time slice allocated to each. This will result in requests which need multiple packets to fill being sent out in a sequential fashion. For example, if each of 100 backfill requests will require 10 data packets to fill, rather than sending all 10 of one request before sending any of the others, packet 1 for all requests will be sent, then packet 2 for all requests, and so forth for all 10 packets.

This results in the packets arriving at the requesting replica node in a piecemeal fashion separated by some time delay. However, if the timeout values are updated as previously described, all packets will be received before the timeout values completely expire.

L. Tracking Deleted Data Objects

From time-to-time, objects within a replica may be deleted. In such a situation, the system must have a mechanism in place for tracking the objects which have been deleted. Embodiments within the scope of this invention may, therefore, comprise means for tracking objects deleted from a replica. In one preferred embodiment, this means comprises a tombstone set. A tombstone set comprises a list of all IDs corresponding to data objects which have been deleted or are otherwise missing from a replica. When a data object is created, it is presently preferred that the data object be assigned a unique ID. Any method of assigning unique IDs may be utilized, for example, the ID may be a FUID as previously described in Section C. When a data object is deleted from a replica, the ID corresponding to that data object is stored in the tombstone set. Use of such a mechanism allows the system to track which data objects have been deleted or are otherwise missing from the replicas.

In one preferred embodiment, the entire tombstone set is transferred as part of a backfill response so that the replica node receiving the backfill response knows that the deleted item existed at one time. In the preferred embodiment, tombstone sets are also included as part of a data packet sent as part of the normal replication process if there was a deletion since the last data packet was replicated.

M. Expiring Data

In many networking environments, it is common to retain certain types of data for a maximum period of time. For example, many systems storing E-mail data will save received E-mail messages for a relatively short period of time, for example, two weeks or one month, after which the E-mail messages are automatically deleted. Other scenarios also arise where it is desirable or necessary to automatically delete data older than a specific time period. These are cases involving "expired data." A detailed discussion of replication of expired data is contained in the copending Data Expiration Application, previously incorporated herein by reference. It is preferred that embodiments within the present invention properly handle expired data. If embodiments within the scope of this invention do not have mechanisms in place to properly handle expired data, a situation may arise where data expires and is deleted from one replica node only to be recovered via the backfill process from another replica node which has not expired the data. Obviously, such a scenario would defeat the purpose and intent of expired data.

In order to properly handle expired data, embodiments within the scope of this invention can be provided with means for removing and tracking expired data. Within the scope of the present invention, such means for removing and tracking expired data can be added to an existing processing block as, for example, received change set processing block 32, or a processing block dedicated to this purpose may be added. The means for removing and tracking expired data requires two basic components. The first is a mechanism to remove, from the local change set, data which has expired. The second is a mechanism to track which data at the local replica note has expired so that backfill timeout processing block 40 of FIG. 2 will not request expired data from other replica nodes.

Properly handling expired data thus requires two major aspects. The first aspect is that expired data should be handled in such a way that other replica nodes on the replica list do not request expired data from the local replica node. The second aspect is that the local replica node should not request expired data from other replica nodes which have not expired the data. This requires the two mechanisms previously described.

In order to prevent other replica nodes from requesting expired data from the local replica node, expired data is removed from the local change set. Thus, when the local change set is distributed to other replica nodes on the replica list, the other replica nodes will understand that the expired data is not available from the local replica node. In order to prevent the local replica node from requesting expired data from other replica nodes which have not expired the data, a list of data which has expired needs to be maintained at the local node. Thus, when change sets are received from other replica nodes, received change set processing block 32 can compare the received change sets with the list of expired data and skip entering a backfill element into backfill set 34 for data which has expired at the local node. This will prevent backfill timeout processing block 40 from requesting expired data from other replica nodes on the replica list which have not expired the data.

N. Rebuilding a Replica Node

In any computer network, the possibility, and indeed likelihood, exists that from time-to-time a system will need to be rebuilt. For example, systems may become unstable due to hardware problems, viruses, or other situations where the current state of the system is invalid and the system must be restored from backup or archive sources. When this occurs there is always some difference between the state of the system when it crashed and the state of the system as it is restored from the backup or archived data. This is due, in large part, because of the time lag and processing which occurs from the time that the backup or archive was made to the time when the backup or archive is restored to the system.

When a replica node is rebuilt via backup or archive sources, care must be taken to properly handle the unique IDs within the enterprise. For example, many of the concepts described in the discovery base to data recovery system of the present invention rely on unique identifiers that are unique across the entire enterprise. If these identifiers are not unique, the replication enterprise can become unstable and function improperly. When data is restored from a backup or archive location, a situation arises where identifiers may no longer be unique. Consider, for example, a situation where a system is backed up at time $T_1$. At the time the backup is made, a particular replica object had a change number, for example A1. At some time later, a change is made to the replica object and the change number is incremented to A2. After this change has been distributed to other replica nodes in the enterprise, the system crashes and must be restored from the backup. When the system is restored, the data will have change number Al, notwithstanding the system had already issued change A2 to other replica nodes on the replica list. If, now, another change is made to the data and the system increments the change number to A2, the identifier would no longer be unique.

In order to avoid the above-described problem, it is preferred that embodiments within the scope of this invention comprise means for preventing re-use of IDs after data restoration. In one preferred embodiment, such means comprises means for assigning a new GUID before data restoration. By assigning a new GUID to the replica node before data restoration commences, when the data is restored from backup, the system will behave as if the restored data came from another replica node over the network. Furthermore, zeroing the counter value appended to the GUID in order to create FUIDs as previously described in Section C will ensure proper operation of the discovery based data recovery system of the present invention.

Such an approach provides an elegant way of bringing the restored replicas up to date with respect to other replicas in the enterprise. Once the system begins to receive change sets from other replica nodes, the system will request missing changes, as previously described in this invention. Thus, creating a new GUID for a replica node before data restoration not only solves the problem of keeping identifiers unique across the enterprise but also solves the problem of bringing the restored replicas up to date with respect to the other replicas in the enterprise.

O. Summary

In summary, the present invention is drawn to a discovery based data recovery system and method. The system and method utilize a replication process which exchanges with other replica nodes on the replica object distribution list changes made locally to the replica object. The system and method also utilize an MTA which is capable of delivering at least one-way, unacknowledged communications to designated replica nodes. In its most preferred form, the system and method tracks changes made locally to a replica object or made at other replica nodes and received via the MTA and stores the changes in a change set. The replica node then periodically broadcasts the local change set to other replica nodes on the replica object distribution list having a copy of the replica object. Change sets from the other replica nodes are received in turn. By comparing received change sets with the local change set, a replica node can discover if its replica object is missing changes owned by other replica nodes. Once the missing changes are discovered, the replica node can take steps to recover the data by requesting the missing data from other replica nodes having the data.

Presently preferred embodiments within the scope of this invention can also comprise various mechanisms to aid in startup and maintenance of a replication enterprise. For example, embodiments within the scope of this invention comprise means to reduce discovery time in appropriate circumstances by sending one or more types of information request packets to other replica nodes. In order to properly handle expired data, embodiments may comprise means for removing and tracking expired data. Finally, in order to properly handle data restored from a backup or archive source, embodiments may comprise means for preventing re-use of IDs after data restoration.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network having a plurality of nodes, a method for discovering data missing from a local copy of a replica object replicated at one of said nodes, and for recovering the missing data, the method comprising the steps of:
    keeping, at a local node, a local change set comprising a list of changes that have been made to a local copy of a replica object, said replica object replicated at at least one other node in the network, said list of changes comprising both changes made at said local node and changes made at said at least one other node that have been received by said local node and applied to said local copy of said replica object;
    sending said local change set to said at least one other node;
    receiving a change set from said at least one other node, said received change set comprising a list of changes including both changes made by said at least one other node to a copy of said replica object replicated at said at least one other node and changes received by said at least one other node from any other node and applied to said copy of said replica object replicated at said at least one other node; and
    discovering at said local node any data missing from the local copy of the replica object by comparing the received change set to the local change set to identify changes listed in the received change set, but not listed in the local change set.

2. A method for discovering and recovering missing data as recited in claim 1 further comprising the step of requesting changes, listed in said received change set but not listed in said local change set, from at least a selected one of said plurality of nodes.

3. A method for discovering and recovering missing data as recited in claim 2 wherein a specified time elapses between the step of comparing the received change set to the local change set and the step of requesting changes listed in the received change set but not listed in the local change set.

4. A method for discovering and recovering missing data as recited in claim 2 wherein the changes listed in the received change set but not listed in the local change set are requested from a node selected in accordance with a node selection criteria which minimizes the time required to receive the requested changes according to a designated minimization criteria.

5. A method for discovering and recovering missing data as recited in claim 4 wherein the node selection criteria also balances the requests among the one or more other nodes according to a designated balancing criteria.

6. A method for discovering and recovering missing data as recited in claim 1 further comprising the step of entering changes found in the received change set but not found in the local change set into a backfill set.

7. A method for discovering and recovering missing data as recited in claim 6 further comprising the step of associating a time delay value with the changes entered into the backfill set.

8. A method for discovering and recovering missing data as recited in claim 1 further comprising the step of comparing the received change set with a backfill set comprising a list of changes missing from said local node.

9. A method for discovering and recovering missing data as recited in claim 1 further comprising the step of sending a message to one or more other nodes which comprises the local change set.

10. A method for discovering and recovering missing data as recited in claim 1 further comprising the step of sending an information request message to one or more other nodes, said information request message comprising a request for change sets located at said one or more other nodes.

11. A method for discovering and recovering missing data as recited in claim 1 wherein the replica object comprises at least one data object of a data set.

12. A method for discovering and recovering missing data as recited in claim 1 wherein the replica object comprises properties of a data set.

13. In a network having a plurality of nodes, a method for discovering data missing from a local copy of a replica object replicated at one of said nodes, and for recovering the missing data, the method comprising the steps of:
    keeping, at a local node, a local change set comprising a list of changes that have been made to a local copy of a replica object, said replica object replicated at at least one other node in the network, said list of changes comprising both changes made at said local node and changes made at said at least one other node that have been received by said local node and applied to said local copy of said replica object;
    sending said local change set to said at least one other node;
    receiving a change set from said at least one other node, said received change set comprising a list of changes including both changes made at said at least one other node to a copy of said replica object replicated at said at least one other node and changes received by said at least one other node from any other node and applied to said copy of said replica object replicated at said at least one other node;
    discovering at said local node any data missing from the local copy of the replica object by comparing the received change set to the local change set to determine if the received change set contains changes not found in the local change set;
    entering the changes listed in the received change set but not listed in the local change set into a backfill set comprising a list of changes missing from the local change set;
    selecting at least one of the at least one other node according to a specified criteria designed to minimize the cost of receiving changes missing from the local change set; and
    sending a message to said selected at least one of the at least one other node requesting the changes missing from the local change set.

14. A method for discovering and recovering missing data as recited in claim 13 further comprising the step of waiting a specified time prior to the step of sending a message requesting the changes missing from the local change set.

15. A method for discovering and recovering missing data as recited in claim 14 further comprising the step of comparing the received change set to the backfill set.

16. A method for discovering and recovering missing data as recited in claim 15 further comprising the step of removing from said backfill set the changes listed in the received change set and also listed in the backfill set.

17. A method for discovering and recovering missing data as recited in claim 16 further comprising the step of entering into said local change set the changes listed in the received change set and also listed in the backfill set.

18. A method for discovering and recovering missing data as recited in claim 17 further comprising the step of sending to one or more other nodes a message comprising the local change set.

19. A method for discovering and recovering missing data as recited in claim 18 further comprising the step of sending to said one or more other nodes a message comprising a request for change sets located at said one or more other nodes.

20. In a network having a plurality of nodes, a method for discovering data missing from a local copy of a replica object replicated at one of said nodes, and for recovering the missing data, the method comprising the steps of:

keeping at a local node a local change set comprising a list of changes that have been made to a local copy of a replica object, said replica object replicated at at least one other node in the network, said list of changes comprising both changes made at said local node and changes made at said at least one other node that have been received by said local node and applied to said local copy of said replica object;

broadcasting from said local node to one or more other nodes in the network an information request message, said information request message comprising a request for a change set from said one or more other nodes;

receiving at said local node said requested change set from said one or more other nodes; and discovering at said local node any data missing from said local copy of the replica object comparing the received change set to the local change set to identify changes listed in the received change set, but not listed in the local change set.

21. A method for discovering and recovering missing data as recited in claim 20 wherein the information request message is broadcast from the local node when the local node is first started.

22. A method for discovering and recovering missing data as recited in claim 20 wherein the information request message also contains a copy of a local change set kept by the local node.

23. In a network system comprising a plurality of replica nodes, each logically connected to one another, an article of manufacture for use in a local replica node having a copy of a designated replica object, each replica node comprising a CPU, said article of manufacture comprising:

program storage means, accessible by the CPU, for storing and providing to the CPU program code means, said program code means comprising:

means for storing a local change set comprising changes made to a local copy of a designated replica object, said changes originating at either of said local replica node or any other replica node;

means for sending said local change set to other replica nodes;

means for receiving from said other replica nodes at least one received change set containing changes made to copies of the designated replica object at said other replica nodes and changes received by said other replica nodes from any other replica node and applied to said copies of the designated replica object; and means for comparing said at least one received change set to said local change set in order to discover data missing from said local copy of the designated replica object.

24. An article of manufacture as recited in claim 23 wherein the program code means further comprises means for requesting from other replica nodes data missing from the local change set.

25. An article of manufacture as recited in claim 23 wherein the program code means further comprises means for requesting from other replica nodes change sets stored at said other systems.

26. An article of manufacture as recited in claim 23 wherein the means for sending said local change set to other replica nodes uses one-way, unacknowledged communication messages to transfer the local change set.

27. An article of manufacture as recited in claim 23 wherein the program code means further comprises means for storing a backfill set comprising a list of changes missing from said local change set.

28. An article of manufacture as recited in claim 23 wherein the program code means further comprises means for scheduling requests for data missing from the local change set.

29. An article of manufacture as recited in claim 23 wherein the program code means further comprises means for designating a replica node which does not respond to a request as inactive.

30. An article of manufacture as recited in claim 23 wherein the program code means further comprises means to select a replica node that will be used to fill a request for data missing from the local change set.

31. An article of manufacture as recited in claim 30 wherein said means to select a replica node that will be used to fill a request for data comprises means to select the replica node based on minimization, according to a specified criteria, of the cost incurred to receive said missing data.

32. An article of manufacture as recited in claim 23 wherein the replica object comprises at least one data object of a data set.

33. An article of manufacture as recited in claim 23 wherein the replica object comprises the properties of a data set.

34. In a network system comprising a plurality of replica nodes, each logically connected to one another, an article of manufacture for use in a local replica node having a local copy of a designated replica object, each replica node comprising a CPU, said article of manufacture comprising:

program storage means, accessible by the CPU, for storing and providing to the CPU program code means, said program code means comprising:

means for storing a local change set comprising changes made to a local copy of a designated replica object, said changes originating at either of said local replica node or any other replica node;

means for sending said local change set to the other replica nodes;

means for receiving from said other replica nodes at least one received change set containing changes made to copies of the designated replica object at said other replica nodes and changes received by said other replica nodes from any other replica node and applied to said copies of the designated replica object;

means for comparing said at least one received change set to said local change set in order to discover data missing from said local copy of the designated replica object; and means for requesting from said other replica nodes data missing from said local copy of the designated replica object.

35. An article of manufacture as recited in claim 34 wherein the program code means further comprises means for storing a backfill set comprising a list of changes missing from said local change set.

36. An article of manufacture as recited in claim 35 wherein the program code means further comprises means for scheduling requests for data missing from the local change set.

37. An article of manufacture as recited in claim 36 wherein the program code means further comprises means for selecting which replica node will be used to request data missing from the local change set.

38. An article of manufacture as recited in claim 37 wherein the means for selecting which replica node will be used to request data comprises means for selecting the replica node based on minimization, according to a specified criteria, of the cost incurred in receiving said missing data.

39. An article of manufacture as recited in claim 38 wherein the program code means further comprises means for designating a replica node which does not respond to a request as inactive.

40. An article of manufacture as recited in claim 39 wherein the program code means further comprises means for requesting from other replica nodes change sets stored at said other replica nodes.

41. An article of manufacture as recited in claim 34 wherein the program code means further comprises means for tracking objects deleted from a replica.

42. An article of manufacture as recited in claim 34 wherein the program code means further comprises means for removing and tracking expired data.

43. An article of manufacture as recited in claim 42 wherein the means for removing and tracking expired data comprises:

means for removing, from said local change set, data which has expired; and means for tracking which data has expired and been removed from said local change set.

\* \* \* \* \*